(12) United States Patent
Yokoyama et al.

(10) Patent No.: US 11,904,833 B2
(45) Date of Patent: Feb. 20, 2024

(54) VEHICLE CONTROL DEVICE

(71) Applicant: TOYOTA JIDOSHA KABUSHIKI KAISHA, Aichi-ken (JP)

(72) Inventors: Daiki Yokoyama, Gotemba (JP); Hiroya Chiba, Susono (JP); Yoshiyuki Kageura, Shizuoka-ken (JP); Masanori Shimada, Susono (JP); Yoshihiro Sakayanagi, Mishima (JP); Sui Kurihashi, Shizuoka-ken (JP); Hiroki Morita, Hiratsuka (JP); Makoto Ogiso, Mishima (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 114 days.

(21) Appl. No.: 17/530,482

(22) Filed: Nov. 19, 2021

(65) Prior Publication Data

US 2022/0194353 A1    Jun. 23, 2022

(30) Foreign Application Priority Data

Dec. 21, 2020 (JP) ................................. 2020-211480

(51) Int. Cl.
*B60W 10/08* (2006.01)
*B60W 20/12* (2016.01)
(Continued)

(52) U.S. Cl.
CPC ............ *B60W 20/12* (2016.01); *B60W 10/06* (2013.01); *B60W 10/08* (2013.01); *B60W 10/30* (2013.01);
(Continued)

(58) Field of Classification Search
CPC ...... B60W 10/06; B60W 10/08; B60W 10/30; B60W 20/12; B60W 2710/244;
(Continued)

(56) References Cited

U.S. PATENT DOCUMENTS 8,612,117 B2 * 12/2013 Senda .................... F02P 5/1516
60/320
9,169,751 B2 * 10/2015 Hussain .................... F01P 3/20
(Continued)

FOREIGN PATENT DOCUMENTS

CN    109747627 A    5/2019
JP    H775210 A     3/1995
(Continued)

*Primary Examiner* — Gonzalo Laguarda
(74) *Attorney, Agent, or Firm* — HAUPTMAN HAM, LLP

(57) ABSTRACT

A boundary is at an engine drive restricted zone where operation of the internal combustion engine is restricted. An adjusting device adjusts of at least one of the temperature inside the cabin using electric power, the humidity inside the cabin using electric power, or the air pollution degree inside the cabin. In response to a prediction that (1) a host vehicle will enter the inside of the engine drive restricted zone and that (2a) the time period for the host vehicle to reach the boundary is within a preset time period or that (2b) the distance between the host vehicle and the boundary is within a preset distance, the value of at least one of the temperature inside the cabin, the humidity inside the cabin, and the air pollution degree inside the cabin is reduced before the host vehicle enters the inside of the engine drive restricted zone.

11 Claims, 24 Drawing Sheets

(51) Int. Cl.
*B60W 10/06* (2006.01)
*B60W 10/30* (2006.01)
(52) U.S. Cl.
CPC ............... *B60W 2510/0676* (2013.01); *B60W 2710/0688* (2013.01)
(58) Field of Classification Search
CPC ..... B60W 2710/0688; B60W 50/0097; B60W 2510/0676
See application file for complete search history.

(56) References Cited

U.S. PATENT DOCUMENTS

| | | | |
|---|---|---|---|
| 10,071,647 B2* | 9/2018 | Dalum | ................... B60L 53/24 |
| 2016/0023649 A1* | 1/2016 | Muller | .................. B60W 20/13 |
| | | | 701/22 |
| 2018/0134274 A1* | 5/2018 | Ogawa | ................. B60W 10/06 |
| 2018/0245546 A1 | 8/2018 | Haga | |
| 2019/0135070 A1 | 5/2019 | Lee | |
| 2019/0143977 A1* | 5/2019 | Tada | ........................ B60K 6/48 |
| | | | 701/22 |

FOREIGN PATENT DOCUMENTS

| | | |
|---|---|---|
| JP | H11-005440 A | 1/1999 |
| JP | 2007-045406 A | 2/2007 |
| JP | 2018-141378 A | 9/2018 |
| JP | 201985094 A | 6/2019 |
| KR | 1020190093097 A | 8/2019 |

\* cited by examiner

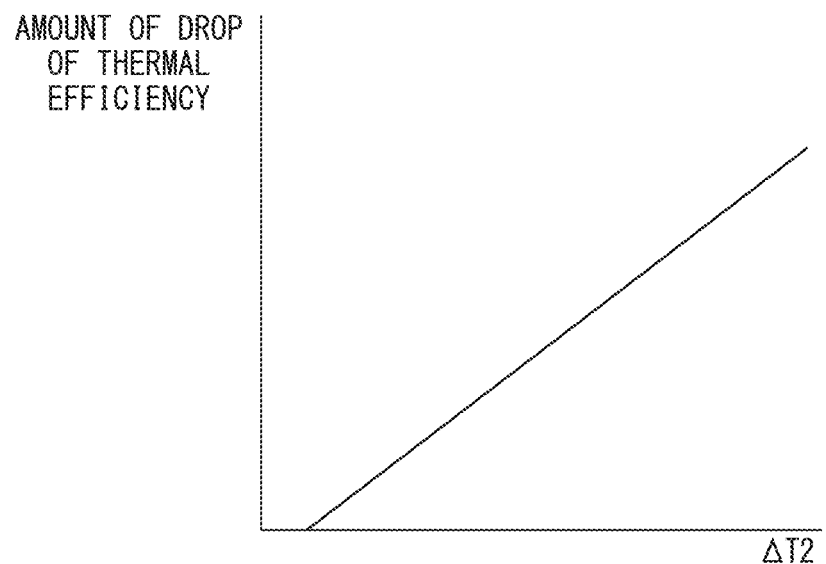

VEHICLE CONTROL DEVICE

RELATED APPLICATIONS

The present application claims priority of Japanese Patent Application No. 2020-211480 filed Dec. 21, 2020, the disclosure of which is hereby incorporated by reference herein in its entirety.

FIELD

The present invention relates to a vehicle control device.

BACKGROUND

In recent years, an increasing number of countries have established engine drive restricted zones restricting operation of internal combustion engines and have established controls prohibiting operation of internal combustion engines in such engine drive restricted zones from the viewpoint of prevention of air pollution, from the viewpoint of prevention of noise, or from other viewpoints. To enable such controls to be dealt with, known in the art is a hybrid vehicle provided with an internal combustion engine for power generation use or drive use, a battery charged by a power generating action of a generator driven by the internal combustion engine or regenerative control, and an electric motor driven by the battery, in which hybrid vehicle, when the vehicle passes through the inside of a region with reinforced air pollution prevention controls, the operation of the internal combustion engine is stopped and the electric motor is used to operate the vehicle (for example, see Japanese Unexamined Patent Publication No. 7-75210).

SUMMARY

In this regard, the environment inside the cabin such as the temperature inside the cabin or the humidity inside the cabin is normally adjusted to the optimal environment using an air-conditioning device which consumes a large amount of electric power. The same is true when the vehicle is located in the engine drive restricted zone. In this regard, however, if a large amount of electric power is consumed for adjusting the environment inside the cabin to the optimal environment when the vehicle is located in the engine drive restricted zone, it will end up becoming impossible to continue driving the vehicle by the electric motor in the engine drive restricted zone.

In this case, to enable the vehicle to continue being driven by the electric motor in the engine drive restricted zone, it can be said to be preferable to be able to consume a large amount of electric power to adjust the environment inside the cabin to the optimum environment before the vehicle enters inside of the engine drive restricted zone when located outside of the engine drive restricted zone where power can be generated by the internal combustion engine and to use a small amount of electric power to adjust the environment inside the cabin to the optimum environment after the vehicle enters inside of the engine drive restricted zone. However, the above-mentioned vehicle control device does not suggest anything regarding this.

Therefore, according to the present invention, there is provided a vehicle control device of a hybrid vehicle driven by only an electric motor or by both of an electric motor and an internal combustion engine, wherein a boundary is set between an inside of an engine drive restricted zone where operation of the internal combustion engine is restricted and an outside of the engine drive restricted zone, said vehicle control device comprising:

an adjusting device performing at least one adjustment among adjustment of a temperature inside a cabin performed using electric power, adjustment of a humidity inside the cabin performed using electric power, and adjustment of an air pollution degree inside the cabin performed using electric power, a navigation device searching for a running route up to a destination when a destination is input, an information acquiring unit acquiring position information of a host vehicle and information relating to said boundary, a judging unit judging whether a time period required for the host vehicle to reach the boundary is within a preset time period or whether a distance between the host vehicle and the boundary is within a preset distance when it is judged based on the information acquired by the information acquiring unit that the host vehicle is positioned at the outside of the engine drive restricted zone and it is predicted based on search results by the navigation device that the host vehicle will enter the inside of the engine drive restricted zone, and an internal cabin environment control unit making a value of at least one of a temperature inside the cabin, a humidity inside the cabin, and an air pollution degree inside the cabin change from a current value to a preset set value side from an intermediate value of the current value and the preset set value before the host vehicle enters the engine drive restricted zone when it is judged by the judging unit that the time period required for the host vehicle to reach the boundary is within the preset time period or when it is judged that the distance between the host vehicle and the boundary is within the preset distance.

When a vehicle is located inside of the engine drive restricted zone, it becomes possible to maintain an optimal environment in the cabin while continuing to drive the vehicle by the electric motor.

BRIEF DESCRIPTION OF DRAWINGS

FIG. 12 is a view showing an amount of reduction of thermal efficiency.

FIG. 13A and FIG. 13B are respectively views showing a map of basic ignition timing and a map of a basic EGR control valve opening degree.

DESCRIPTION OF EMBODIMENTS

Figure 1:
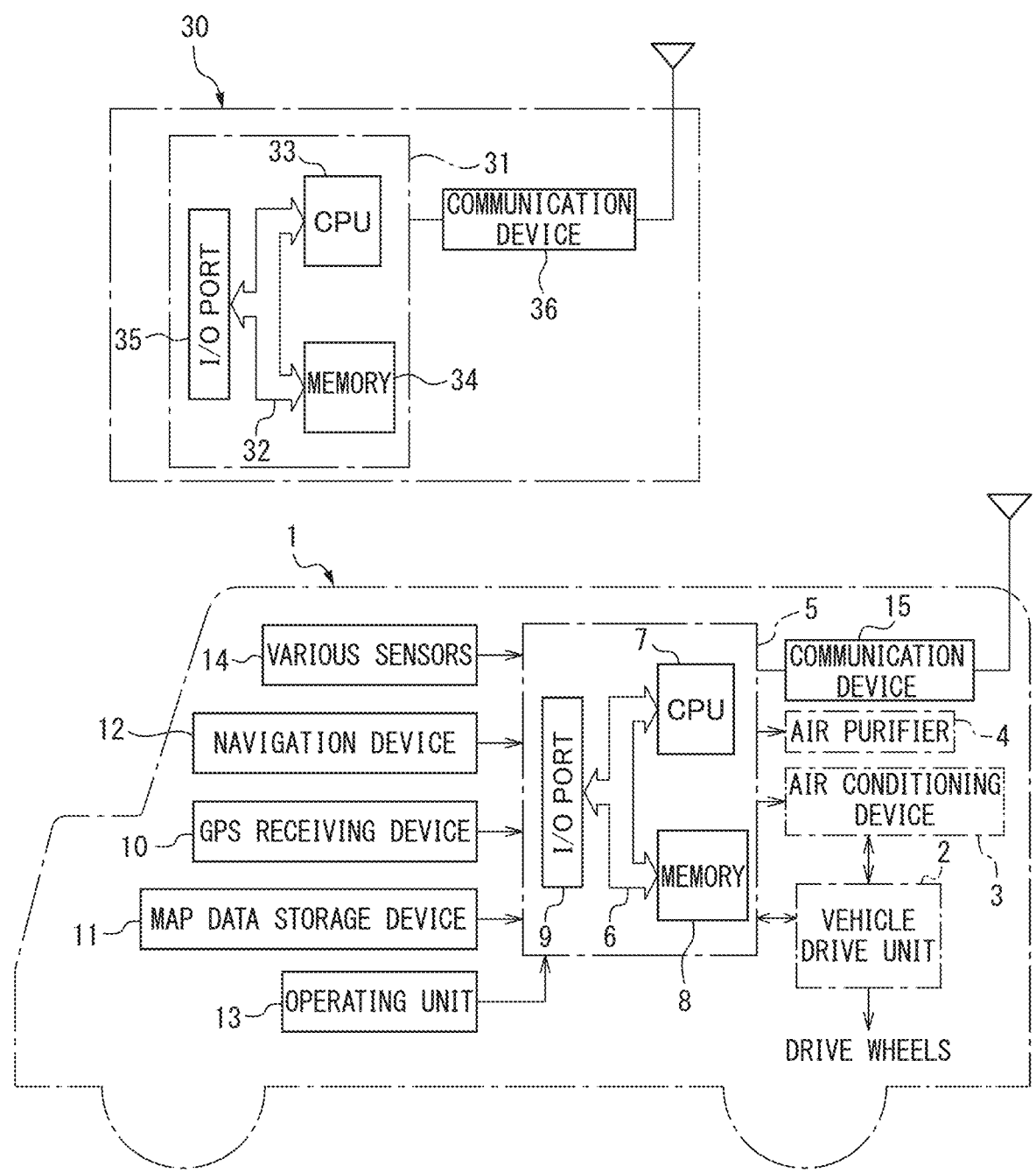
FIG. 1 is a view showing a vehicle and server shown schematically.

Referring to FIG. 1, 1 indicates a hybrid vehicle driven by only an electric motor or by both of an electric motor and an internal combustion engine. Further, in FIG. 1, 2 indicates a vehicle drive unit for imparting drive power to drive wheels, 3 indicates an air-conditioning device for vehicle cabin use, 4 indicates an air purifier for vehicle cabin use, and 5 indicates an electronic control unit mounted in the vehicle 1. As shown in FIG. 1, the electronic control unit 5 is comprised of a digital computer provided with a CPU (microprocessor) 7, a memory 8 comprised of a ROM and RAM, and an input/output port 9, which are connected with each other by a bidirectional bus 6.

Further, inside of the vehicle 1, a GPS (global positioning system) receiving device 10 for receiving radio waves from artificial satellites to detect a current position of the vehicle 1, a map data storage device 11 storing map data etc., a navigation device 12, and an operating unit 13 set at the vehicle driver's seat for operating the air-conditioning device 3 and the air purifier 4 are mounted. Furthermore, inside of the vehicle 1, an accelerator opening degree sensor, engine rotational speed sensor, temperature sensor for detecting the temperature inside the cabin, humidity sensor for detecting a humidity inside the cabin, an air pollution degree sensor for detecting an air pollution degree inside the cabin, and other various sensors 14 are mounted. These air-conditioning device 3, air purifier 4, GPS receiving device 10, map data storage device 11, navigation device 12, operating unit 13, and various sensors 14 are connected to the electronic control unit 5.

On the other hand, in FIG. 1, 30 indicates a server. As shown in FIG. 1, inside of this server 30, an electronic control unit 31 is set. This electronic control unit 31 is comprised of a digital computer provided with a CPU (microprocessor) 33, a memory 34 comprised of a ROM and RAM, and an input/output port 35, which are connected with each other by a bidirectional bus 32. Furthermore, inside of the server 30, a communication device 36 for communicating with the vehicle 1 is set. On the other hand, in the vehicle 1, a communication device 15 for communicating with the server 30 is mounted.

Figure 2A:
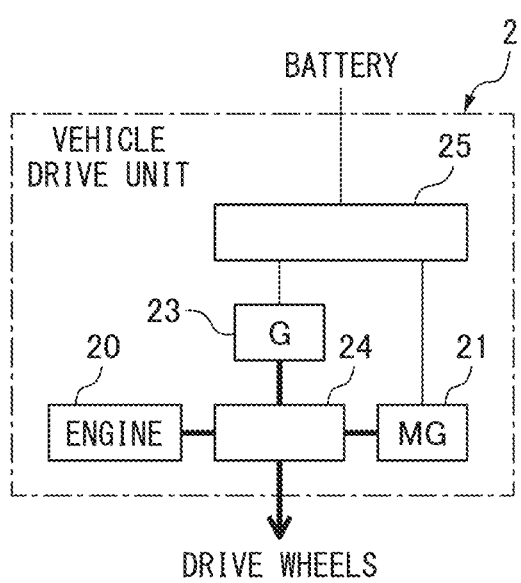
FIG. 2A and FIG. 2B are views of the configuration of a vehicle drive unit.
Figure 2B:
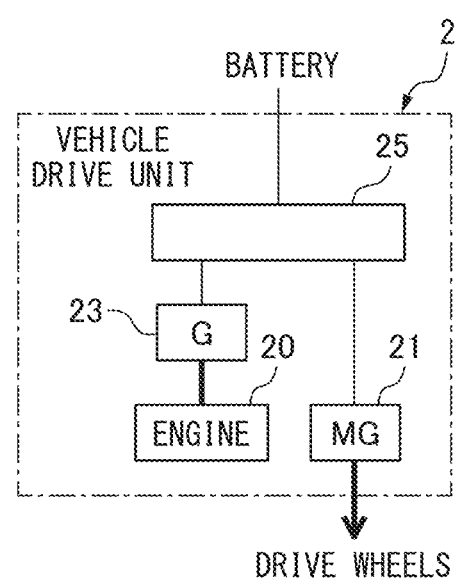

FIG. 2A and FIG. 2B are views of the configuration of the vehicle drive part 2 shown in FIG. 1 and show respectively different types of hybrid systems. These hybrid systems are well known, so will be explained very simply. First, referring to FIG. 2A, the vehicle drive unit 2 is provided with an internal combustion engine 20, an electric motor 21, a generator 23, a power split mechanism 24 comprised of for example a planetary gear mechanism, and a motor control device 25. The electric motor 21 acts as a generator, so usually is called a "motor-generator". For example, at the time of low speed running, the vehicle 1 is driven by the electric motor 21. At this time, electric power is supplied from the battery through the motor control device 25 to the electric motor 21, and the output of the electric motor 21 is transmitted by the power split mechanism 24 to the drive wheels.

On the other hand, at the time of medium and high speed running, the vehicle 1 is driven by the internal combustion engine 20 and electric motor 21. At this time, on one hand, part of the output of the internal combustion engine 20 is transmitted by the power split mechanism 24 to the drive wheels. while, on the other hand, the generator 23 is driven by part of the output of the internal combustion engine 20, the electric motor 21 is driven by the generated electric power of the generator 23, and the output of the electric motor 21 is transmitted by the power split mechanism 24 to the drive wheels. Further, at the time of braking the vehicle 1, the electric motor 21 functions as a generator, and a regenerative control in which the battery is charged by the generated electric power of the electric motor 21 is performed. Further, when the state of charge of the battery has fallen, the generator 23 is driven by the internal combustion engine 20 through the power split mechanism 24, and the battery is charged by the generated electric power of the generator 23.

Next, referring to FIG. 2B, the vehicle drive unit 2 is provided with an internal combustion engine 20, an electric motor 21, a generator 23, and a motor control device 25. In the hybrid system shown in FIG. 2B as well, the electric motor 21 acts as a generator as well, so usually is called a "motor-generator". In this hybrid system, the vehicle 1 is continuously driven by the electric motor 21. On the other hand, if the state of charge of the battery falls, the generator 23 is driven by the internal combustion engine 20, and the battery is charged by the generated electric power of the generator 23. Further, in this hybrid system as well, at the time of braking the vehicle 1, the electric motor 21 functions as a generator, and a regenerative control in which the battery is charged by the generated electric power of the electric motor 21 is performed. In the hybrid system shown in either of FIG. 2A and FIG. 2B as well, the internal combustion engine 20 and power split mechanism 24 are controlled by output signals of the electronic control unit 5, while the electric motor 21 and the generator 23 are controlled by the motor control device 25 based on output signals of the electronic control unit 5.

In this regard, if referring to the mode where only the electric motor 21 is used for driving the vehicle 1 as the "EV mode" and referring to the mode where both of the internal combustion engine 20 and electric motor 21 are used for driving the vehicle 1 as the "HV mode", in the hybrid vehicle 1 provided with the hybrid system shown in FIG. 2A, the vehicle is selectively switched to either mode of the EV mode and the HV mode. On the other hand, in the hybrid vehicle 1 provided with the hybrid system shown in FIG. 2B, only the electric motor 21 is used for driving the vehicle 1. The internal combustion engine 20 is used for driving the generator 23 and charging the battery, so in this vehicle 1, the drive mode of the vehicle 1 is always made the EV mode. Note that, the hybrid systems shown in FIG. 2A and FIG. 2B are representative examples. In the present invention, various types of hybrid systems can be used.

Next, referring to FIG. 3, the air-conditioning device 3 and the air purifier 4 provided inside the cabin 40 will be explained. First, if explaining the air-conditioning device 3, inside a duct 41 of the air-conditioning device 3, a blower 42, an evaporator 51 of a cooling device 50, a heater core 60 through which cooling water of the internal combustion engine 20 circulates, and a door 44 controlled to swing by an actuator 43 are arranged. As shown by the arrows in FIG. 3, the air taken in by the blower 42 is sent through the evaporator 51 and the heater core 60 to the inside of the cabin 40. The cooling device 50 is comprised of the evaporator 51, a refrigerant-use compressor 52, a condenser 53, and an expansion valve 54. The refrigerant raised in pressure by the refrigerant-use compressor 52 is liquefied at the condenser 53, then the liquefied refrigerant is sent into the evaporator 51 through the expansion valve 54. The refrigerant sent into the evaporator 51 is converted to a gas by robbing heat from the air passing through the evaporator 51 whereby the temperature of the air flowing through the duct 41 falls.

On the other hand, the internal combustion engine 20 is provided with an electric powered water pump 61 for making the cooling water circulate and a radiator 62. The cooling water flowing out from the water pump 61 to a water pump outflow path 63 circulates through the inside of the water jacket inside an engine body 64 to rise in temperature, then passes through a cooling water return path 65 and the radiator 62 to be returned to a water pump inflow path 67. Inside of the cooling water return path 65, a switch valve 68 is arranged for returning the cooling water to the water pump 61 bypassing the radiator 62 as shown by the arrows at the time of warmup operation. On the other hand, part of the cooling water flowing out to the water pump outflow path 63 is sent through a cooling water passage 69 to the heater core 60. Inside this cooling water passage 69, an exhaust heat recovery device 70 for recovering the exhaust gas heat and making the temperature of the cooling water rise. Therefore, the heater core 60 is sent the cooling water raised in temperature at the exhaust heat recovery device 70. The cooling water sent to the heater core 60 imparts heat to the air passing through the heater core 60 whereby the temperature of the air flowing through the duct 41 is raised. Next, the cooling water is returned to the water pump inflow path 67.

When cooling the inside of the cabin 40, the air-conditioning device 3 is made the cooling mode for performing the cooling action. That is, the door 44 is swung to a position obstructing inflow to the heater core 60 as shown by the broken line so that the air cooled by the evaporator 51 flows to the inside of the cabin 40 without passing through the heater core 60. At this time, the more the drive electric power of the refrigerant-use compressor 52 is made to increase, the more rapidly the temperature inside the cabin 40 is made to fall. On the other hand, when heating the inside of the cabin 40, the air-conditioning device 3 is made a heating mode for performing a heating action. That is, the supply of refrigerant to the evaporator 51 is stopped and the door 44 is swung to a position shown by the solid line so that the air heated by passing through the heater core 60 flows to the inside of the cabin 40. At this time, the more the temperature of the cooling water circulating through the inside of the heater core 60 is made to rise, the more rapidly the temperature inside the cabin 40 is made to rise. In this way, the air-conditioning device 3 has both the functions of a cooling device and a heating device.

Further, the air purifier 4, as shown by the arrow marks, sucks in the air inside the cabin 40 through a filter 71 and discharges the purified air into the inside of the cabin 40. In this case, the more the drive electric power of the air purifier 4 is made to increase, the more rapidly the air pollution degree inside the cabin 40 is made to fall.

Figure 4:
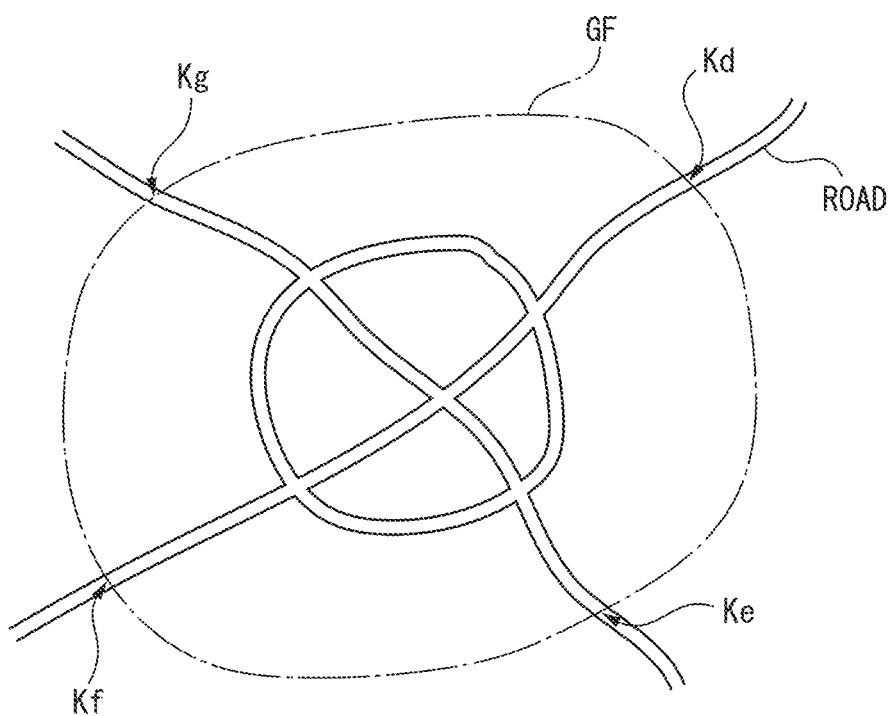
FIG. 4 is a view schematically showing a road map.

Now then, in recent years, an increasing number of countries have established engine drive restricted zones restricting operation of internal combustion engines and have established controls prohibiting operation of internal combustion engines in such engine drive restricted zones from the viewpoint of prevention of air pollution, from the viewpoint of prevention of noise, or from other viewpoints. FIG. 4 schematically shows a boundary GF between the inside of the engine drive restricted zone and the outside of the engine drive restricted zone established in a certain region. The inside of this boundary GF is made the engine drive restricted zone. This boundary GF is usually called "geofencing". This boundary GF is sometimes fixed and is sometimes variable in position due to the situation of air pollution or some other reasons.

In FIG. 4, Kd, Ke, Kf, Kg show positions on the boundary GF at each road. At the road positions Kd, Ke, Kf, Kg positioned on the boundary GF, sometimes gates are provided. In this case, a rider of the vehicle 1 can recognize that the vehicle 1 has entered the inside of the engine drive restricted zone by its passing these gates. Further, at this time, if a signal is emitted showing that the vehicle 1 has entered the inside of the engine drive restricted zone from a device set at the gate, it is possible to recognize that the vehicle 1 has entered the inside of the engine drive restricted zone by receiving this signal.

On the other hand, information relating to the boundary GF, that is, geofencing, is sometimes stored in the map data storage device 11. Further, information relating to the boundary GF, that is, geofencing, is sometimes stored in the memory 34 of the server 30, and information relating to the boundary GF, that is, geofencing, is sometimes transmitted from the server 30 to the vehicle 1. In these cases, the position of the boundary GF, that is, geofencing, is displayed on the display screen of the navigation device 12 based on the map information stored in the map data storage device 11 or based on the map information transmitted from the server 30 to the vehicle 1. From the map information displayed on the display screen of the navigation device 12, it is possible to recognize that the vehicle 1 has entered inside of the engine drive restricted zone.

Note that, in the case where the hybrid system shown in FIG. 2A is used, when the driver or other rider has recognized that the vehicle 1 has entered inside of an engine drive restricted zone, usually the operating mode is made the EV mode by the driver, the internal combustion engine 20 is made to stop operation, and the electric motor 21 is used to drive the vehicle 1. On the other hand, in the case where the hybrid system shown in FIG. 2B is used, when the driver or other rider has recognized that the vehicle 1 has entered inside of an engine drive restricted zone, usually the internal combustion engine 20 is made to stop operation by the driver and the generator 23 is stopped being driven for charging the battery 3. Note that, when the vehicle 1 has entered inside of the engine drive restricted zone, if the hybrid system shown in FIG. 2A is used, sometimes the operating mode is automatically made the EV mode, while if the hybrid system shown in FIG. 2B is used, sometimes the internal combustion engine 20 is automatically made to stop operation.

Now then, the environment inside of the cabin 40 such as the temperature inside the cabin 40 or the humidity inside the cabin 40 is adjusted to the optimum environment using the air-conditioning device 3 which consumes a large amount of electric power. This is the same when the vehicle 1 is positioned at the engine drive restricted zone. In this regard, however, when the vehicle 1 is positioned in the engine drive restricted zone, if a large amount of electric power is consumed for adjusting the environment inside the cabin 40 to the optimum environment, in the engine drive restricted zone, the vehicle 1 ends up being unable to continue operating in the EV mode. In this case, to enable the vehicle 1 to continue being operated in the EV mode in the engine drive restricted zone, it can be said to be preferable to be able to consume a large amount of electric power to adjust the environment inside the cabin 40 to the optimum environment before the vehicle enters the inside of the engine drive restricted zone when located outside of the engine drive restricted zone where power can be generated by the internal combustion engine 20 and to use a small amount of electric power to adjust the environment inside the cabin 40 to the optimum environment after the vehicle enters the inside of the engine drive restricted zone.

Therefore, in the embodiment according to the present invention, when the host vehicle 1 is positioned outside of the engine drive restricted zone, if it is predicted that the host vehicle 1 will momentarily enter inside of the engine drive restricted zone, the temperature inside the cabin 40, the humidity inside the cabin 40, or the air pollution degree inside of the cabin 40 is made to change from the current temperature, humidity, or air pollution degree value to a set temperature, a set humidity, or a set air pollution degree preset by a rider of the host vehicle 1 before the host vehicle 1 enters the inside of the engine drive restricted zone. If in this way making the temperature inside the cabin 40, the humidity inside the cabin 40, or the air pollution degree inside of the cabin 40 change from the current temperature, humidity, or air pollution degree value to a set temperature, a set humidity, or a set air pollution degree preset by a rider of the host vehicle 1 before the host vehicle 1 enters the inside of the engine drive restricted zone, even if the temperature inside the cabin 40, the humidity inside the cabin 40, or the air pollution degree inside of the cabin 40 deviates somewhat from the preset set temperature, preset set humidity, or preset set air pollution degree after the host vehicle 1 enters the inside of the engine drive restricted zone, it becomes possible to use a small amount of electric power to control the temperature inside the cabin 40, the humidity inside the cabin 40, or the air pollution degree inside of the cabin 40 to the preset set temperature, preset set humidity, or preset set air pollution degree and, therefore, it becomes possible to continue to operate the vehicle 1 in the EV mode.

In this case, in the embodiment according to the present invention, provision is made of the navigation device 12 searching for a running route to a destination if a destination is input, and whether the host vehicle 1 will enter inside of the engine drive restricted zone is predicted based on the search result of this navigation device 12. In addition, it is judged whether the host vehicle 1 will momentarily enter the inside of the engine drive restricted zone based on whether the time period required for the host vehicle 1 to reach the boundary GF is within a preset time period or whether the distance between the host vehicle 1 and boundary GF is within a preset distance.

On the other hand, to enable the host vehicle 1 to continue being operated in the EV mode after the vehicle 1 enters the inside of the engine drive restricted zone, the temperature inside the cabin 40, the humidity inside the cabin 40, or the air pollution degree inside of the cabin 40 is most preferably made to change to the preset set temperature, preset set humidity, or preset set air pollution degree before the host vehicle 1 enters the inside of the engine drive restricted zone. However, if making the temperature inside the cabin 40, the humidity inside the cabin 40, or the air pollution degree inside of the cabin 40 change to more than an intermediate value between the current temperature, humidity, or air pollution degree value and the preset set temperature, preset set humidity, or preset set air pollution degree before the host vehicle 1 enters the inside of the engine drive restricted zone, there is a high possibility that the vehicle 1 can continue to be operated in the EV mode. Therefore, in the embodiment according to the present invention, the temperature inside the cabin 40, the humidity inside the cabin 40, or the air pollution degree inside of the cabin 40 is made to change to the preset set temperature, preset set humidity, or preset set air pollution degree side from an intermediate value of the current temperature, humidity, or air pollution degree value and the preset set temperature, preset set humidity, or preset set air pollution degree before the host vehicle 1 enters the inside of the engine drive restricted zone.

Figure 5:
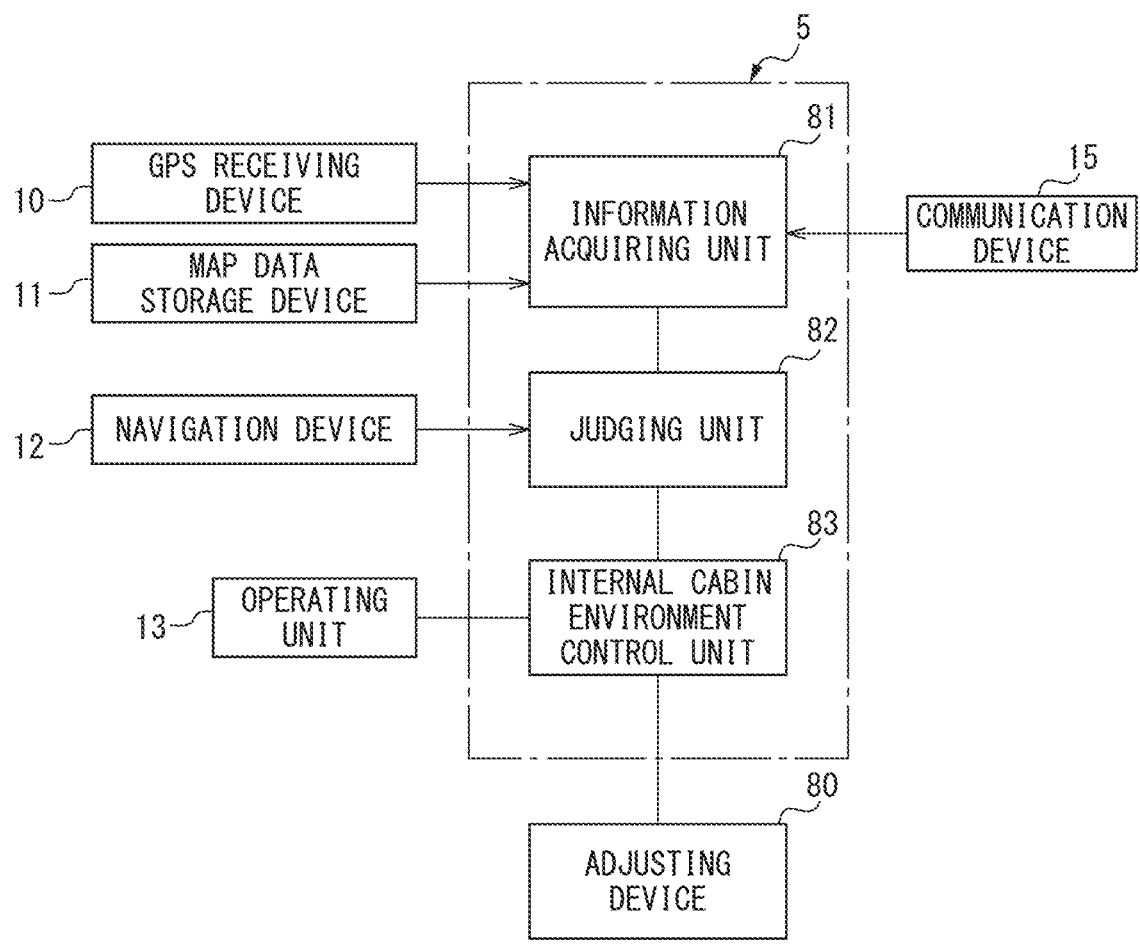
FIG. 5 is a view of the configuration of the present invention.

That is, according to the present invention, as shown in the view of the configuration of FIG. 5, in a vehicle control device of a hybrid vehicle driven by only an electric motor 21 or by both of an electric motor 21 and an internal combustion engine 20, a boundary GF is set between the inside of the engine drive restricted zone where operation of the internal combustion engine 20 is restricted and the outside of the engine drive restricted zone, and the vehicle control device comprises an adjusting device 80 performing at least one adjustment among adjustment of a temperature inside a cabin 40 performed using electric power, adjustment of a humidity inside the cabin 40 performed using electric power, and adjustment of an air pollution degree inside the cabin 40 performed using electric power, a navigation device 12 searching for a running route up to a destination when a destination is input, an information acquiring unit 81 acquiring position information of a host vehicle 1 and information relating to the boundary GF, a judging unit 82 judging whether a time period required for the host vehicle 1 to reach the boundary GF is within a preset time period or whether a distance between the host vehicle 1 and the boundary GF is within a preset distance when it is judged based on the information acquired by the information acquiring unit 81 that the host vehicle 1 is positioned at the outside of the engine drive restricted zone and it is predicted based on search results by the navigation device 12 that the host vehicle 1 will enter the inside of the engine drive restricted zone, and an internal cabin environment control unit 83 making a value of at least one of a temperature inside the cabin 40, a humidity inside the cabin 40, and an air pollution degree inside the cabin 40 change from a current value to a preset set value side from an intermediate value of the current value and the preset set value before the host vehicle 1 enters the engine drive restricted zone when it is judged by the judging unit 82 that the time period required for the host vehicle 1 to reach the boundary GF is within the preset time period or when it is judged that the distance between the host vehicle 1 and the boundary GF is within the preset distance. In this case, in this embodiment according to the present invention, the air-conditioning device 3 or the air purifier 4 configures the adjusting device 80.

Note that, in this embodiment according to the present invention, as explained above, when it is judged by the judging unit 82 that the time period until the host vehicle 1 reaches the boundary GF is within the preset time period or when it is judged that the distance between the host vehicle 1 and the boundary GF is within the preset distance, it is most preferable to make the value of at least one of the temperature inside the cabin 40, the humidity inside the cabin 40, and the air pollution degree inside of the cabin 40 change from the current value to the preset set value before the host vehicle 1 enters the inside of the engine drive restricted zone.

Now then, in the embodiment according to the present invention, when it is judged by the judging unit 82 that the time period required for the host vehicle 1 to reach the boundary GF is within the preset time period or when it is judged that the distance between the host vehicle 1 and the boundary GF is within the preset distance, a proximity flag showing that the host vehicle 1 has approached the boundary GF is set. If this proximity flag is set, the interior cabin environment control part 83 makes the value of at least one of the temperature inside the cabin 40, the humidity inside the cabin 40, and the air pollution degree inside of the cabin 40 change from the current value more to a preset set value side from an intermediate value between the current value and the preset set value before the host vehicle 1 enters the inside of the engine drive restricted zone.

Figure 6:
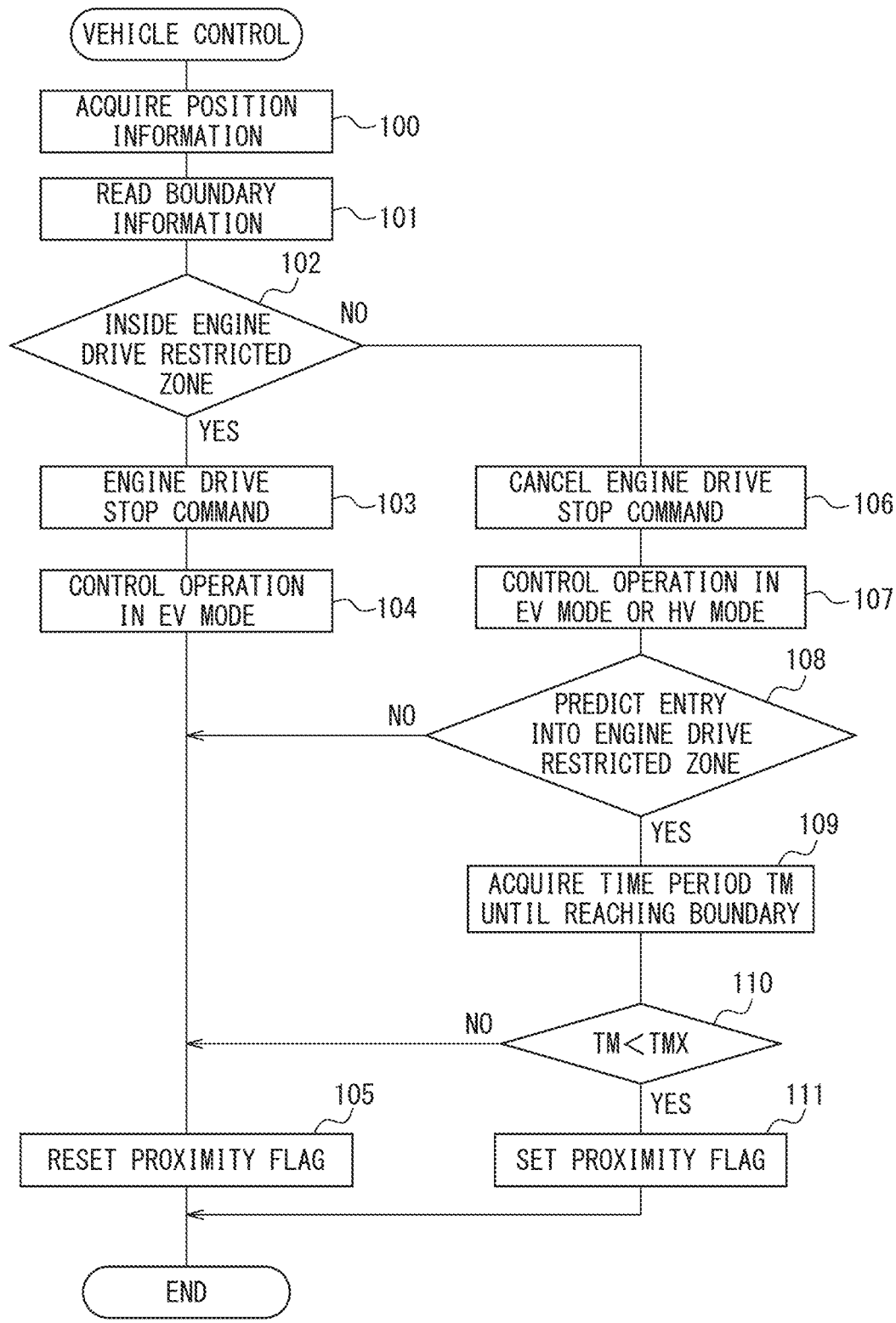
FIG. 6 is a flow chart for performing vehicle control.
Figure 7:
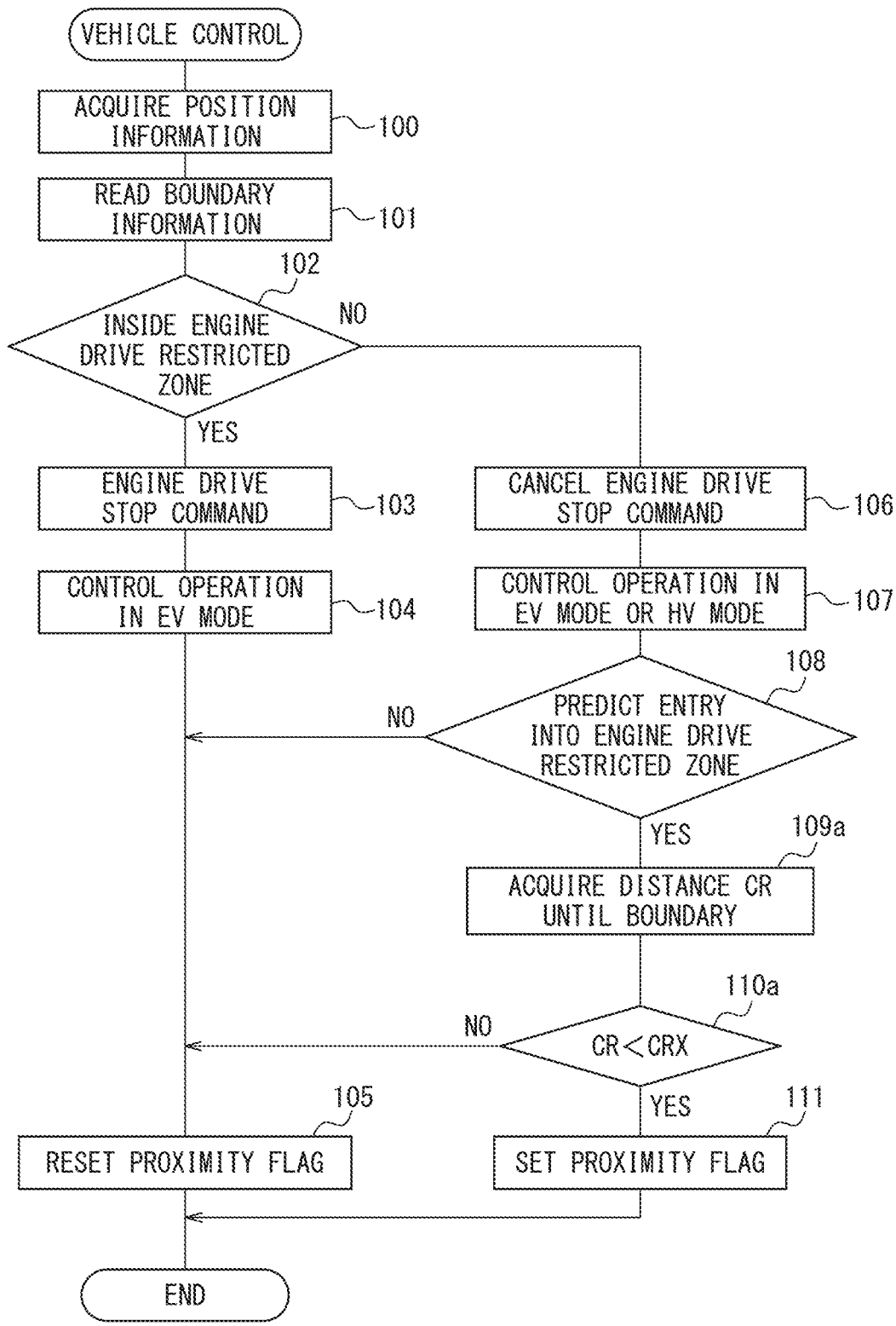
FIG. 7 is a flow chart for performing vehicle control.

Next, taking as an example the case where the hybrid system shown in FIG. 2A is used, the control of the vehicle 1 performed in the embodiment according to the present invention will be explained. FIG. 6 and FIG. 7 show control routines of the vehicle 1 in the embodiment according to the present invention. These routines are performed every fixed time period in the electronic control unit 5 mounted in the host vehicle 1. Note that, FIG. 6 shows the case where a proximity flag is set when it is judged that the time period required for the host vehicle 1 to reach the boundary GF is within the preset time period, while FIG. 7 shows the case where a proximity flag is set when it is judged that the distance between the host vehicle 1 and the boundary GF is within the preset distance.

Referring to FIG. 6, first, at step 100, the current position of the vehicle 1 is acquired based on the received signals received by the GPS receiving device 10 and the map data stored in the map data storage device 11. Next, at step 101, road positions Kd, Ke, Kf, Kg located on the boundary GF between inside of the engine drive restricted zone and outside of the engine drive restricted zone and other information relating to the boundary GF are read. In this case, if the information relating to the boundary GF is stored in the map data storage device 11, the information relating to the boundary GF stored in the map data storage device 11 is read, while if the information relating to the boundary GF is stored in the server 30, the information relating to the boundary GF sent from the server 30 to the vehicle 1 is read.

Next, at step 102, it is judged if the vehicle 1 is currently running through inside of the engine drive restricted zone where operation of the internal combustion engine 20 is restricted based on the acquired current position of the vehicle 1 and the information relating to the boundary GF. When it is judged that the vehicle 1 is currently running through inside of the engine drive restricted zone, the routine proceeds to step 103 where a command is issued to stop operation of the internal combustion engine 20. If a command to stop operation of the internal combustion engine 20 is issued, the routine proceeds to step 104 where operation of the internal combustion engine 20 is stopped by the driver of the vehicle 1 or automatically, and operating control using the electric motor 21 to drive the vehicle 1 is continued until the command for stopping operation of the internal combustion engine 20 is cancelled. That is, at this time, operating control is performed in the EV mode where only the electric motor 21 is used to drive the vehicle 1. Next, at step 105, the proximity flag is reset.

On the other hand, when at step 102 it is judged that the vehicle 1 is not currently running through inside of the engine drive restricted zone, the routine proceeds to step 106 where the command for stopping operation of the internal combustion engine 20 is cancelled. If the command for stopping operation of the internal combustion engine 20 is cancelled, operation of the internal combustion engine 20 becomes possible. Next, at step 107, operating control is performed in accordance with the operating state of the vehicle 1 in either of the EV mode where only the electric motor 21 is used to drive the vehicle 1 and the HV mode where both of the internal combustion engine 20 and electric motor 21 are used to drive the vehicle 1. Note that, at this time, the internal combustion engine 20 can be used to drive the generator 23 to charge the battery.

Next, at step 108, it is judged whether the host vehicle 1 is predicted to enter inside of the engine drive restricted zone based on the search result of the navigation device 12. When the host vehicle 1 is not predicted to enter inside of the engine drive restricted zone, the routine proceeds to step 105 where the proximity flag is reset. As opposed to this, when the host vehicle 1 is predicted to enter inside of the engine drive restricted zone, the routine proceeds to step 109 where the time period TM required for the host vehicle 1 to reach the boundary GF is calculated based on the acquired current position of the vehicle 1 and the information relating to the boundary GF. In this case, if the time period TM required for the host vehicle 1 to reach the boundary GF is provided by the navigation device 12, the time period TM provided by the navigation device 12 is utilized. Next, at step 110, it is judged if the time period TM required for the host vehicle 1 to reach the boundary GF is within the preset time period TMX.

If the time period TM required for the host vehicle 1 to reach the boundary GF is not within the preset time period TMX, the routine proceeds to step 105 where the proximity flag is reset. As opposed to this, if the time period TM required for the host vehicle 1 to reach the boundary GF is within the preset time period TMX, the routine proceeds to step 111 where the proximity flag is set. If the proximity flag is set, as explained later, processing is performed for making the temperature inside the cabin 40, the humidity inside the cabin 40, or the air pollution degree inside of the cabin 40 change to the preset set temperature, preset set humidity, or preset set air pollution degree side from an intermediate value of the current temperature, humidity, or air pollution degree value and the preset set temperature, preset set humidity, or preset set air pollution degree before the host vehicle 1 enters the inside of the engine drive restricted zone.

FIG. 7 shows the vehicle control routine in the case where the proximity flag is set when it is judged that the distance between the host vehicle 1 and the boundary GF is within the preset distance. Steps 100 to 108 and step 111 in the vehicle control routine shown in FIG. 7 are the same as steps 100 to 108 and step 111 in the vehicle control routine shown in FIG. 6. Only steps 109*a* and 110*a* in the vehicle control routine shown in FIG. 7 differ from steps 109 and 110 in the vehicle control routine shown in FIG. 6. Therefore, in the vehicle control routine shown in FIG. 7, the explanation of steps 100 to 108 will be omitted. Only the parts relating to steps 109*a* and 110*a* will be explained.

Referring to FIG. 7, at step 108, when it is predicted that the host vehicle 1 will enter inside of the engine drive restricted zone based on the search results of the navigation device 12, the routine proceeds to step 109*a* where a distance CR between the host vehicle 1 and the boundary GF is calculated based on the acquired current position of the vehicle 1 and information relating to the boundary GF. In this case, if the distance CR between the host vehicle 1 and the boundary GF is provided by the navigation device 12, the distance CR provided by the navigation device 12 is utilized. Next, at step 110*a*, it is judged if the distance CR between the host vehicle 1 and the boundary GF is within the preset distance CRX.

If the distance CR between the host vehicle 1 and the boundary GF is not within the preset distance CRX, the routine proceeds to step 105 where the proximity flag is reset. As opposed to this, if the distance CR between the host vehicle 1 and the boundary GF is within the preset distance CRX, the routine proceeds to step 111 where the proximity flag is set. If the proximity flag is set, as explained later, processing is performed before the host vehicle 1 enters the inside of the engine drive restricted zone to make the temperature inside the cabin 40, the humidity inside the cabin 40, or the air pollution degree inside of the cabin 40 change to the preset set temperature, preset set humidity, or preset set air pollution degree side from an intermediate value of the current temperature, humidity, or air pollution degree value and the preset set temperature, preset set humidity, or preset set air pollution degree.

Next, the processing for making the temperature inside the cabin 40, the humidity inside the cabin 40, or the air pollution degree inside of the cabin 40 change to the preset set temperature, preset set humidity, or preset set air pollution degree side from an intermediate value of the current temperature, humidity, or air pollution degree value and the preset set temperature, preset set humidity, or preset set air pollution degree before the host vehicle 1 enters the inside of the engine drive restricted zone will be successively explained. First, the case where the temperature inside the cabin 40 is higher than the set temperature preset by a rider of the host vehicle 1 and, therefore, the cooling device is used to make the temperature inside the cabin 40 fall will be explained referring to FIG. 8 to FIG. 11.

Figure 3:
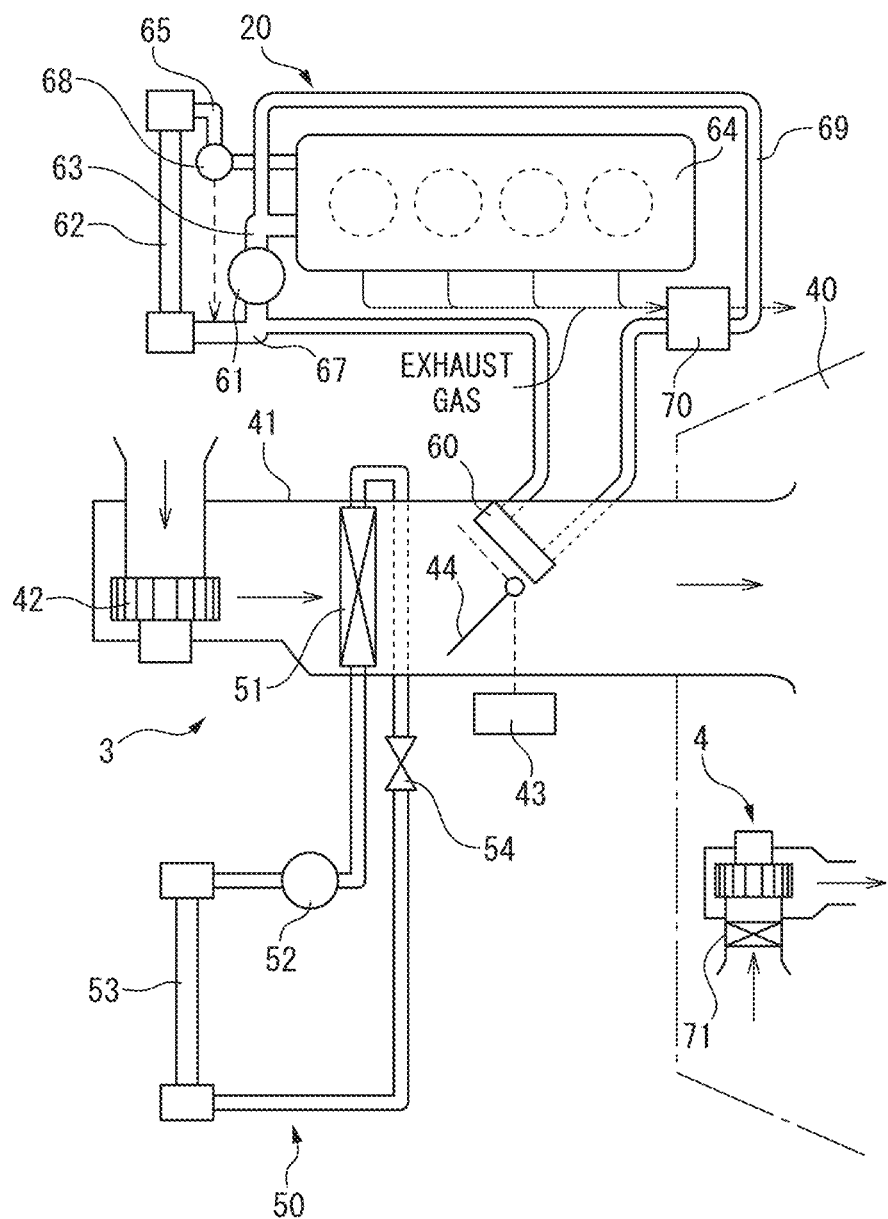
FIG. 3 is a view schematically showing an air-conditioning device and an air purifier.
Figure 8:
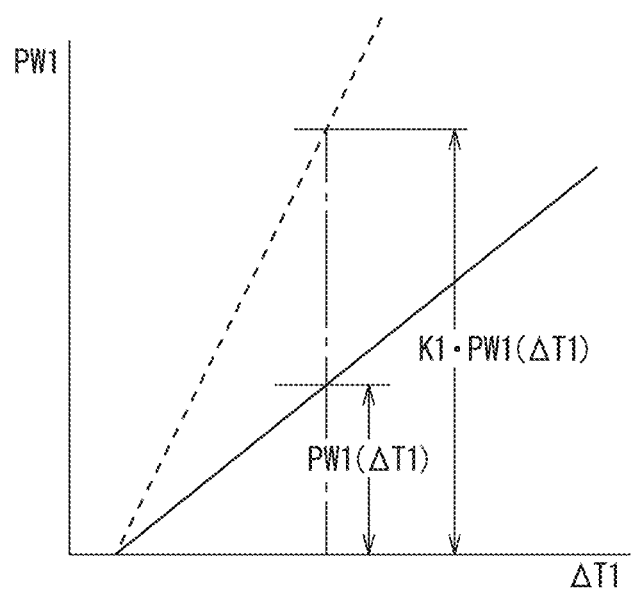
FIG. 8 is a view showing a drive electric power PW1 of a compressor of a cooling device.

As already explained while referring to FIG. 3, when cooling the inside of the cabin 40, the door 44 is made to swing as shown by the broken line to a position blocking inflow to the heater core 60 so that the air cooled by the evaporator 51 flows into the cabin 40 without passing through the heater core 60. At this time, the more the drive electric power of the refrigerant-use compressor 52 is made to increase, the more rapidly the temperature inside the cabin 40 is made to fall. FIG. 8 shows one example of the relationship between the drive electric power PW1 of the refrigerant-use compressor 52 and the temperature difference $\Delta T1$ between the temperature inside the cabin 40 and the preset set temperature (=internal cabin temperature−preset set temperature) in the embodiment according to the present invention. Note that, in FIG. 8, the solid line shows the relationship PW1 ($\Delta T1$) between the drive electric power PW1 of the refrigerant-use compressor 52 at the time of normal operation and the temperature difference $\Delta T1$. As shown in FIG. 8, in this example, the larger the temperature difference $\Delta T1$, the larger the drive electric power PW1 of the refrigerant-use compressor 52 is made.

On the other hand, in FIG. 8, the broken line shows the relationship K1·PW1($\Delta T1$) between the drive electric power PW1 of the refrigerant-use compressor 52 and the temperature difference $\Delta T1$ when it is predicted that the host vehicle 1 will enter inside of the engine drive restricted zone, for example, it is judged that the distance CR between the host vehicle 1 and the boundary GF is within the preset distance CRX. Here, K1 shows a constant. In the example shown in FIG. 8, this constant K1 is larger than 1. Therefore, it will be understood that if comparing cases where the temperature difference $\Delta T1$ is the same, if it is predicted that the host vehicle 1 will enter inside of the engine drive restricted zone, the drive electric power PW1 of the refrigerant-use compressor 52 when it is judged that the distance CR between the host vehicle 1 and the boundary GF is within the preset distance CRX is made to greatly increase compared to the drive electric power PW1 of the refrigerant-use compressor 52 when it is judged that the distance CR between the host vehicle 1 and the boundary GF is more than the preset distance CRX, that is, the drive electric power PW1 of the refrigerant-use compressor 52 at the time of normal operation.

Figure 9:
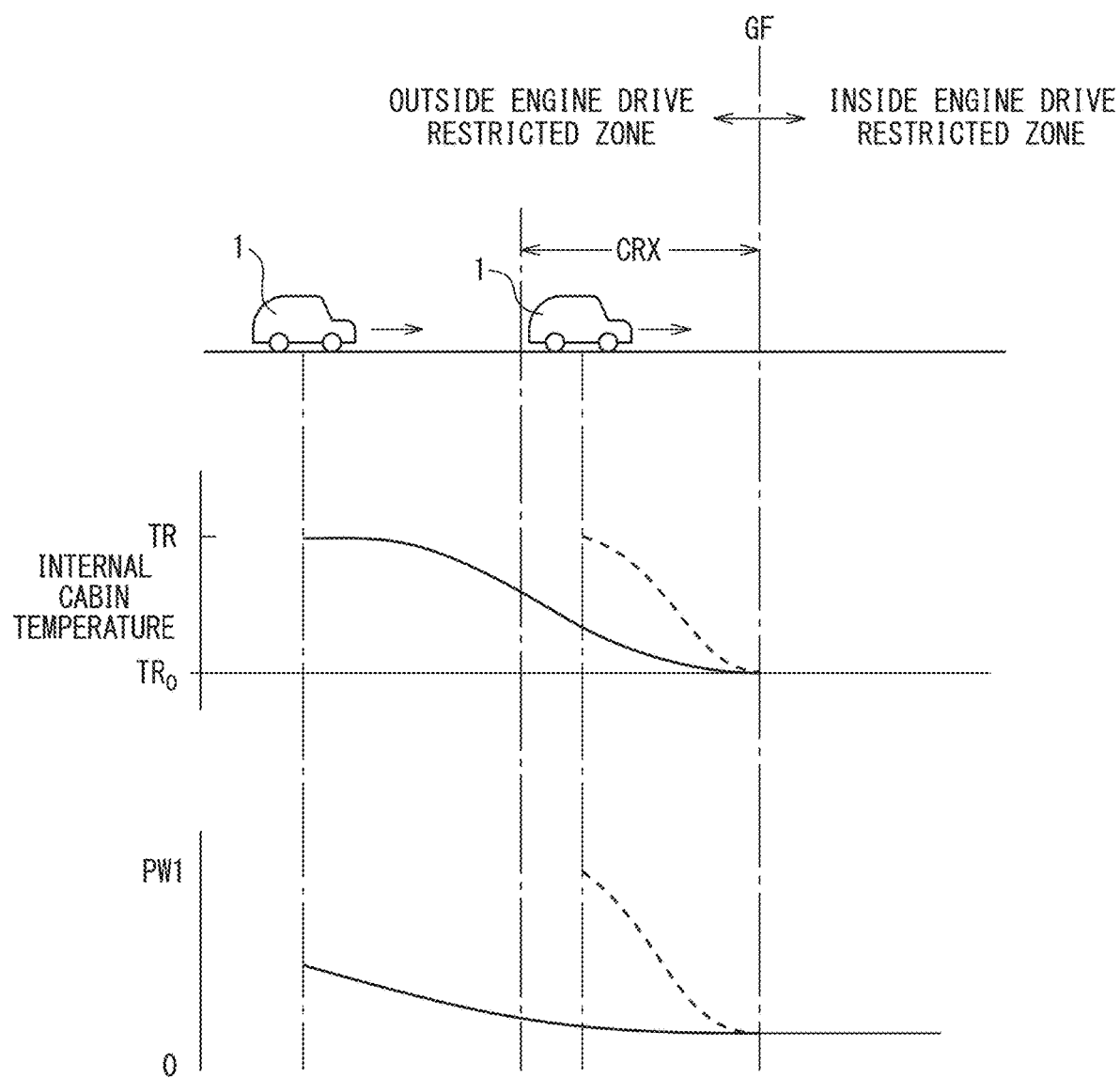
FIG. 9 is a view showing a change along with time of the drive electric power PW1 of the compressor.

FIG. 9 schematically shows the changes along with time of the temperature TR inside the cabin 40 and the drive electric power PW1 of the refrigerant-use compressor 52 in the embodiment according to the present invention in the case where the temperature TR inside the cabin 40 is higher than a set temperature $TR_0$ preset by a rider of the host vehicle 1 and using the cooling device to lower the temperature TR inside the cabin 40. In FIG. 9, the solid line shows the change along with time of the temperature TR inside the cabin 40 at the time of normal operation and the drive electric power PW1 of the refrigerant-use compressor 52, while the broken line shows the change along with time of the temperature TR inside the cabin 40 and the drive electric power PW1 of the refrigerant-use compressor 52 when it is predicted that the host vehicle 1 will enter inside of the engine drive restricted zone and, for example, it is judged that the distance CR between the host vehicle 1 and the boundary GF is within the preset distance CRX. As will be understood from FIG. 9, in this example, when it is predicted that the host vehicle 1 will enter inside of the engine drive restricted zone and, for example, it is judged that the distance CR between the host vehicle 1 and the boundary GF is within the preset distance CRX, as shown by the broken line, the drive electric power PW1 of the refrigerant-use compressor 52 is greatly increased whereby the temperature TR inside the cabin 40 is made to fall to the preset set temperature $TR_0$ before the host vehicle 1 enters the inside of the engine drive restricted zone.

Figure 10:
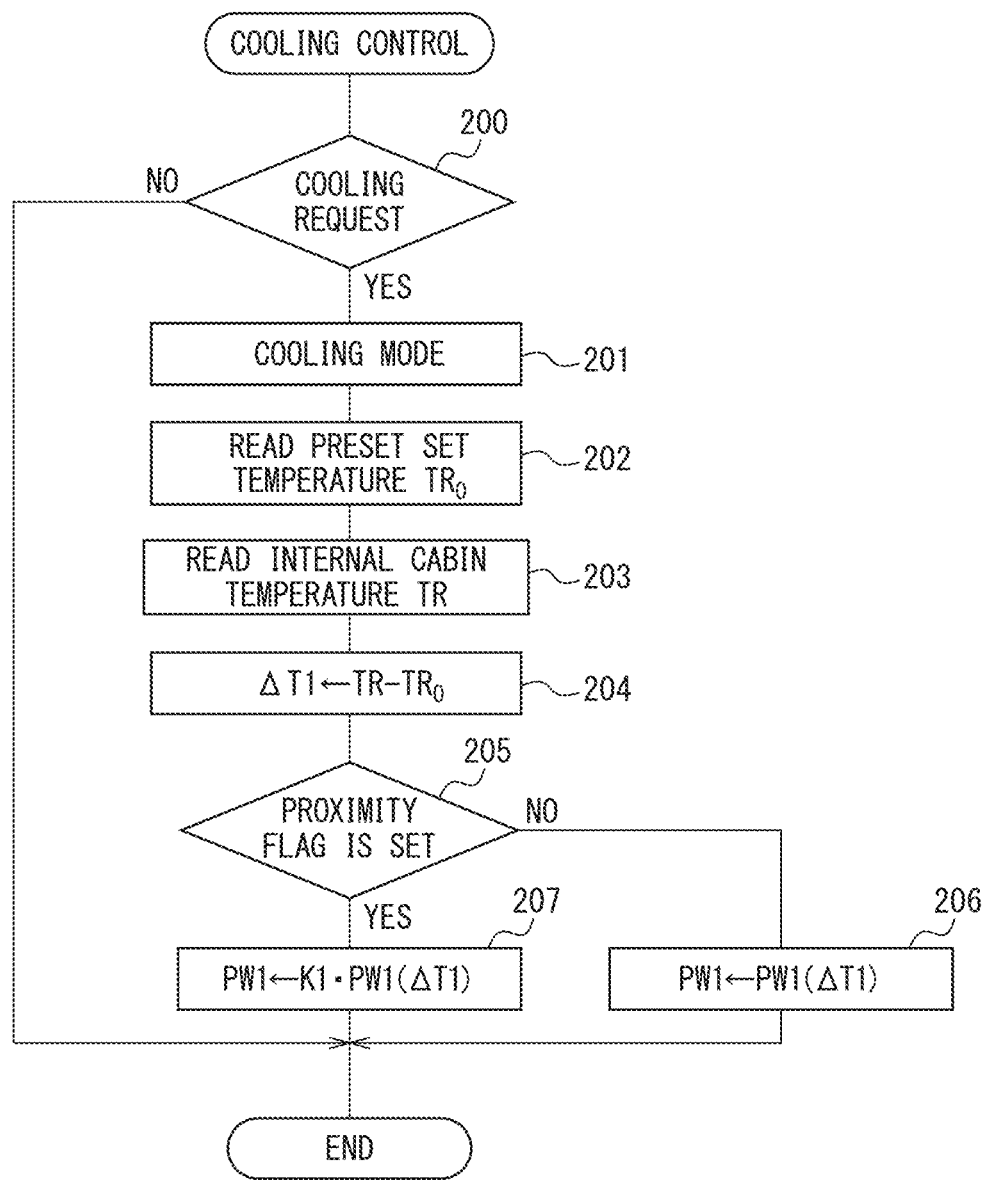
FIG. 10 is a flow chart for performing cooling control.

FIG. 10 shows the cooling control routine performed every fixed time period in the electronic control unit 5. Referring to FIG. 10, first, at step 200, it is judged if a cooling request is made by a rider of the host vehicle 1. If the cooling request is not made, the processing cycle is ended. As opposed to this, when the cooling request is made, the routine proceeds to step 201 where the air-conditioning device 3 is made the cooling mode for performing the cooling action. Next, at step 202, the set temperature $TR_0$ preset by a rider of the host vehicle 1 is read. Next, at step 203, the detected value of the temperature TR inside the cabin 40 is read. Next, at step 204, the temperature difference $\Delta T1$(=internal cabin temperature $TR$−preset set temperature $TR_0$) is calculated. Next, at step 205, it is judged if the proximity flag is set. When the proximity flag is not set, the routine proceeds to step 206 where the drive electric power PW1 of the refrigerant-use compressor 52 is made the drive electric power PW1 ($\Delta T1$) shown by the solid line in FIG. 8 corresponding to the temperature difference $\Delta T1$. As opposed to this, when the proximity flag is set, the routine proceeds to step 207 where the drive electric power PW1 of the refrigerant-use compressor 52 is made the drive electric power K1·PW1 ($\Delta T1$) corresponding to the temperature difference $\Delta T1$ shown by the broken line in FIG. 8.

Figure 11:
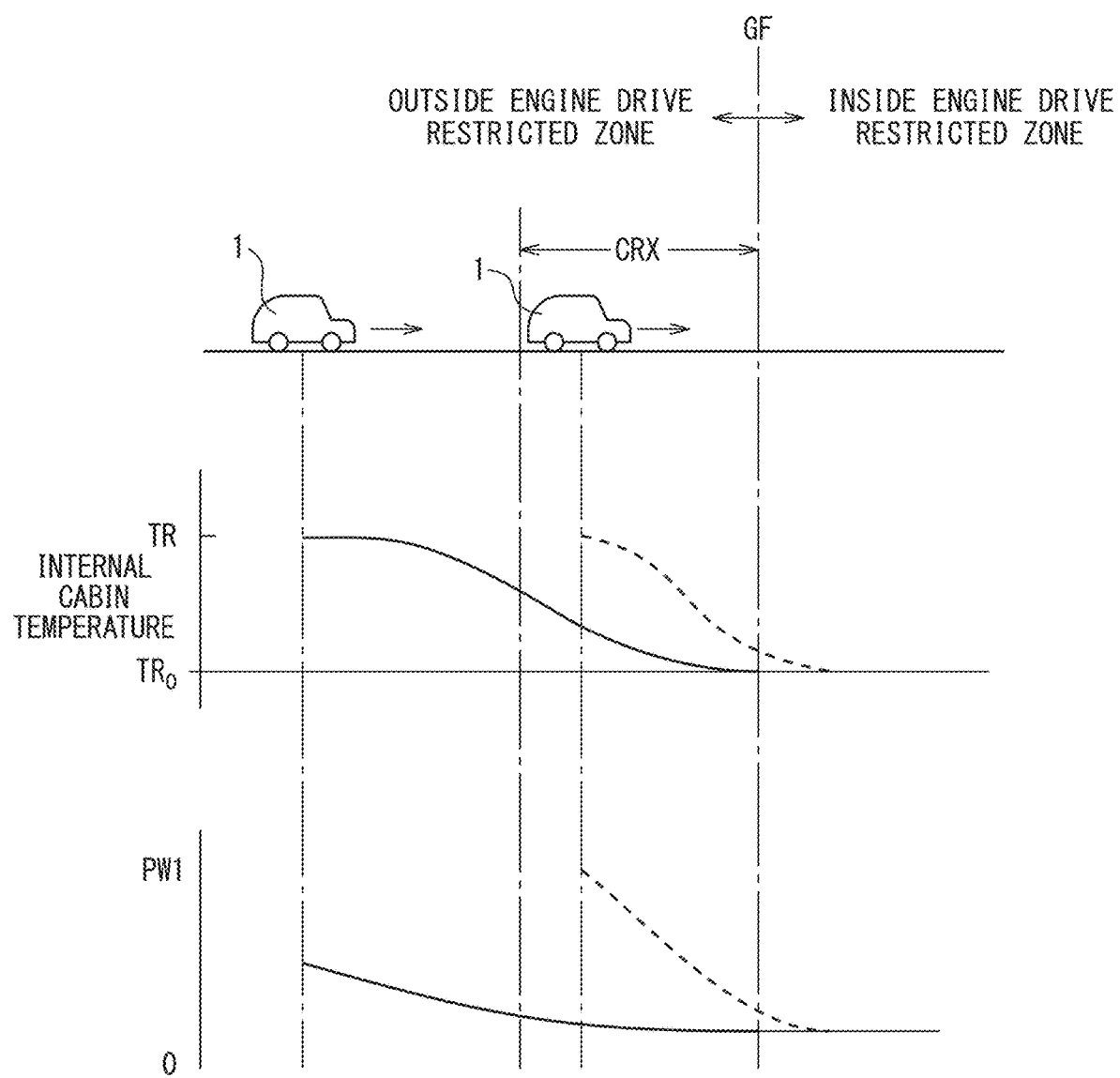
FIG. 11 is a view showing another example of a change along with time of the drive electric power PW1 of the compressor.

FIG. 11 shows another example of the embodiment shown in FIG. 10. In this example as well, the solid line shows the change along with time of the temperature TR inside the cabin 40 at the time of normal operation and the drive electric power PW1 of the refrigerant-use compressor 52, while the broken line shows the change along with time of the temperature TR inside the cabin 40 and the drive electric power PW1 of the refrigerant-use compressor 52 when it is predicted that the host vehicle 1 will enter inside of the engine drive restricted zone and, for example, it is judged that the distance CR between the host vehicle 1 and the boundary GF is within the preset distance CRX. In this example as well, when it is predicted that the host vehicle 1 will enter inside of the engine drive restricted zone and, for example, it is judged that the distance CR between the host vehicle 1 and the boundary GF is within the preset distance CRX, as shown by the broken line, the drive electric power PW1 of the refrigerant-use compressor 52 is made to greatly increase. In this case, in this example, the temperature TR inside the cabin 40 is made to fall to the preset set temperature $TR_0$ side from an intermediate value between the current temperature and the preset set temperature $TR_0$ before the host vehicle 1 enters the inside of the engine drive restricted zone.

In this way, in this example, the adjusting device 80 shown in FIG. 5 is comprised of a cooling device having the refrigerant-use compressor 52. The refrigerant-use compressor 52 is controlled so that when it is judged by the judging unit 82 shown in FIG. 5 that the time period TM required for the host vehicle 1 to reach the boundary GF is within the preset TMX or when it is judged that the distance CR between the host vehicle 1 and the boundary GF is within the preset distance CRX, the temperature TR inside the cabin 40 changes from the current temperature to the preset set cooling temperature $TR_0$ side from an intermediate temperature between the current temperature and the preset set cooling temperature $TR_0$ before the host vehicle 1 enters the inside of the engine drive restricted zone.

In this case, in this example as well, if comparing cases where the temperature difference $\Delta T1$ of the current temperature of the cabin 40 and the preset set cooling temperature $TR_0$ is the same, when it is judged that the time period TM required for the host vehicle 1 to reach the boundary GF is within the preset TMX or when it is judged that the distance CR between the host vehicle 1 and the boundary GF is within the preset distance CRX, the drive electric power PW1 of the refrigerant-use compressor 52 is made to increase compared with when it is judged that the time period TM required for the host vehicle 1 to reach the boundary GF is more than the preset time period TMX or when it is judged that the distance CR between the host vehicle 1 and the boundary GF is more than the preset distance CRX.

Next, referring to FIG. 12 to FIG. 18, the case where the temperature inside the cabin 40 is lower than the set temperature preset by a rider of the host vehicle 1 and, therefore, the heating device is used to make the temperature inside the cabin 40 rise will be explained. Now then, as already explained while referring to FIG. 3, when heating the inside of the cabin 40, the supply of refrigerant to the evaporator 51 is stopped and the door 44 is swung to the position for example shown by the solid line so that the air heated by passing through the heater core 60 flows to the inside of the cabin 40. At this time, the more the temperature of the cooling water circulating through the inside of the heater core 60 is made to rise, the more rapidly the temperature inside the cabin 40 is made to rise. In this case, if the thermal efficiency of the internal combustion engine 20 is made to fall to make the exhaust loss increase and make the amount of heat consumed for raising the temperature of the cooling water increase, the temperature of the cooling water circulating through the inside of the heater core 60 rises. At this time, the more the thermal efficiency is lowered, the more rapidly the temperature of the cooling water circulating through the inside of the heater core 60 can be made to rise and the more rapidly the temperature inside the cabin 40 can be made to rise. Therefore, in the embodiment according to the present invention, if using the heating device to make the temperature inside the cabin 40 rise more rapidly than at the time of normal operation, as shown in FIG. 12, the larger the temperature difference $\Delta T2$ between the temperature inside the cabin 40 and the preset set temperature (=preset set temperature-internal cabin temperature), the more the amount of reduction of the thermal efficiency is increased.

Figure 14:
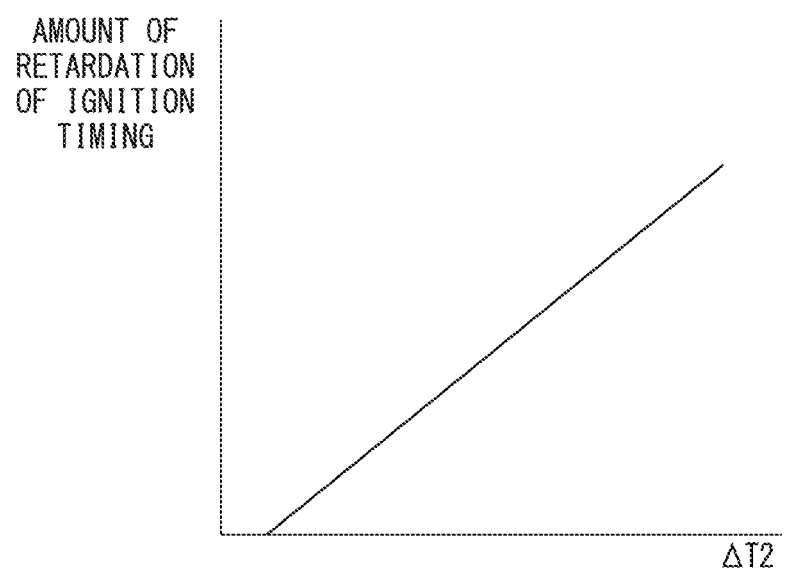
FIG. 14 is a view showing an amount of retardation of ignition timing.

In this regard, if the ignition timing of the internal combustion engine 20 is retarded, the amount of afterburn of the supplied fuel increases and the thermal efficiency falls. At this time, to increase the amount of heat consumed for raising the temperature of the cooling water in the exhaust heat recovery device 70, the temperature of the cooling water circulating through the inside of the heater core 60 rises. In this case, the more the ignition timing is retarded, the more the amount of afterburn of the supplied fuel is increased, so the more the ignition timing is retarded, the more the exhaust gas temperature rises. As a result, the more the ignition timing is retarded, the more rapidly the temperature of the cooling water circulating through the inside of the heater core 60 rises and more rapidly the temperature inside the cabin 40 rises. Therefore, in the first example, if making the temperature inside the cabin 40 rise more rapidly than at the time of normal operation, the ignition timing is retarded and, in this case, the larger the temperature difference $\Delta T2$ (=preset set temperature-internal cabin temperature), the larger the amount of retardation of the ignition timing is made. That is, in the first example, as shown in FIG. 13A, a basic ignition timing IG is stored in the form of a function of the engine rotational speed NE and the engine load L. At the time of normal operation, the ignition timing is made this basic ignition timing IG. As opposed to this, if making the temperature inside the cabin 40 rise more rapidly than the time of normal operation, this amount of retardation from the basic ignition timing IG, as shown in FIG. 14, is made larger the larger the temperature difference $\Delta T2$ (=preset set temperature−internal cabin temperature).

Figure 15:
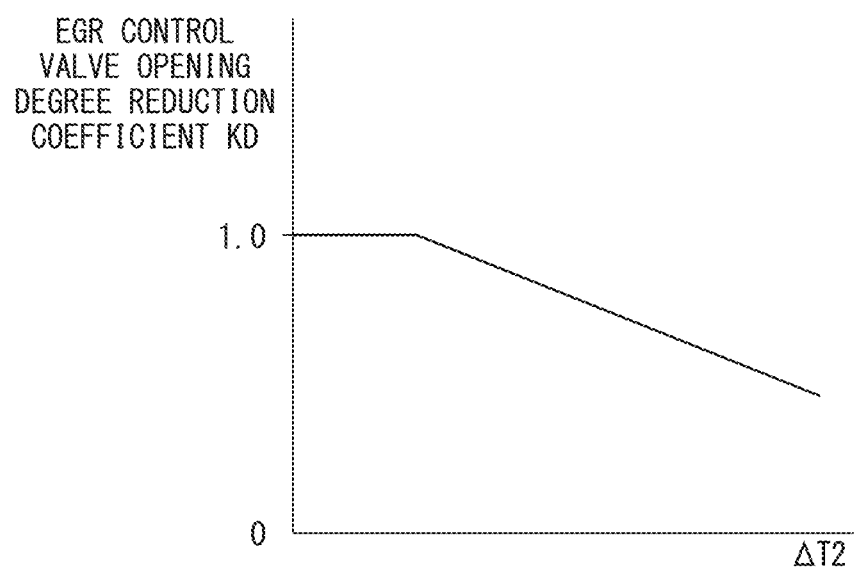
FIG. 15 is a view showing a coefficient KD for decrease of an EGR control valve opening degree.

On the other hand, if reducing the amount of recirculated exhaust gas (below, referred to as "EGR gas") recirculated from the exhaust passage of the internal combustion engine 20 to the intake passage of the internal combustion engine 20, the combustion temperature will become higher, so the amount of heat escaping to the cooling water in the water jacket of the internal combustion engine 20 increases and the thermal efficiency falls. In this case, the more the amount of EGR gas is reduced, the higher the combustion temperature becomes, so the more the amount of EGR gas is reduced, the greater the amount of heat escaping to the cooling water in the water jacket of the internal combustion engine 20. As a result, the more the amount of EGR gas is reduced, the more rapidly the temperature of the cooling water circulating through the inside of the heater core 60 will rise and the more rapidly the temperature inside the cabin 40 will rise. Note that, in this case, the amount of EGR gas decreases if lowering the opening degree of the EGR control valve for controlling the amount of EGR gas. Therefore, in a second example, if making the temperature inside the cabin 40 rise more rapidly that at the time of normal operation, the opening degree of the EGR control valve is lowered. In this case, the larger the temperature difference $\Delta T2$ (=preset set temperature-internal cabin temperature), the more the opening degree of the EGR control valve is lowered. That is, in this second example, as shown in FIG. 13B, a basic opening degree D of the EGR control valve is stored in the form of a function of the engine rotational speed NE and the engine load L. At the time of normal operation, the opening degree of the EGR control valve is made this basic opening degree D. As opposed to this, if making the temperature inside the cabin 40 rise more rapidly that at the time of normal operation, this basic opening degree D is multiplied with an EGR control valve opening degree reduction coefficient KD shown in FIG. 15. This EGR control valve opening degree reduction coefficient KD, as shown in FIG. 15, is made smaller the larger the temperature difference $\Delta T2$ (=preset set temperature-internal cabin temperature). Therefore, if making the temperature inside the cabin 40 rise more rapidly than at the time of normal operation, the larger the temperature difference $\Delta T2$ (=preset set temperature-internal cabin temperature), the smaller the opening degree of the EGR control valve from the basic EGR control valve opening degree D, and thus, the larger the temperature difference $\Delta T2$ (=set temperature-internal cabin temperature), the more the amount of EGR gas is reduced compared with at the time of normal operation.

Figure 16:
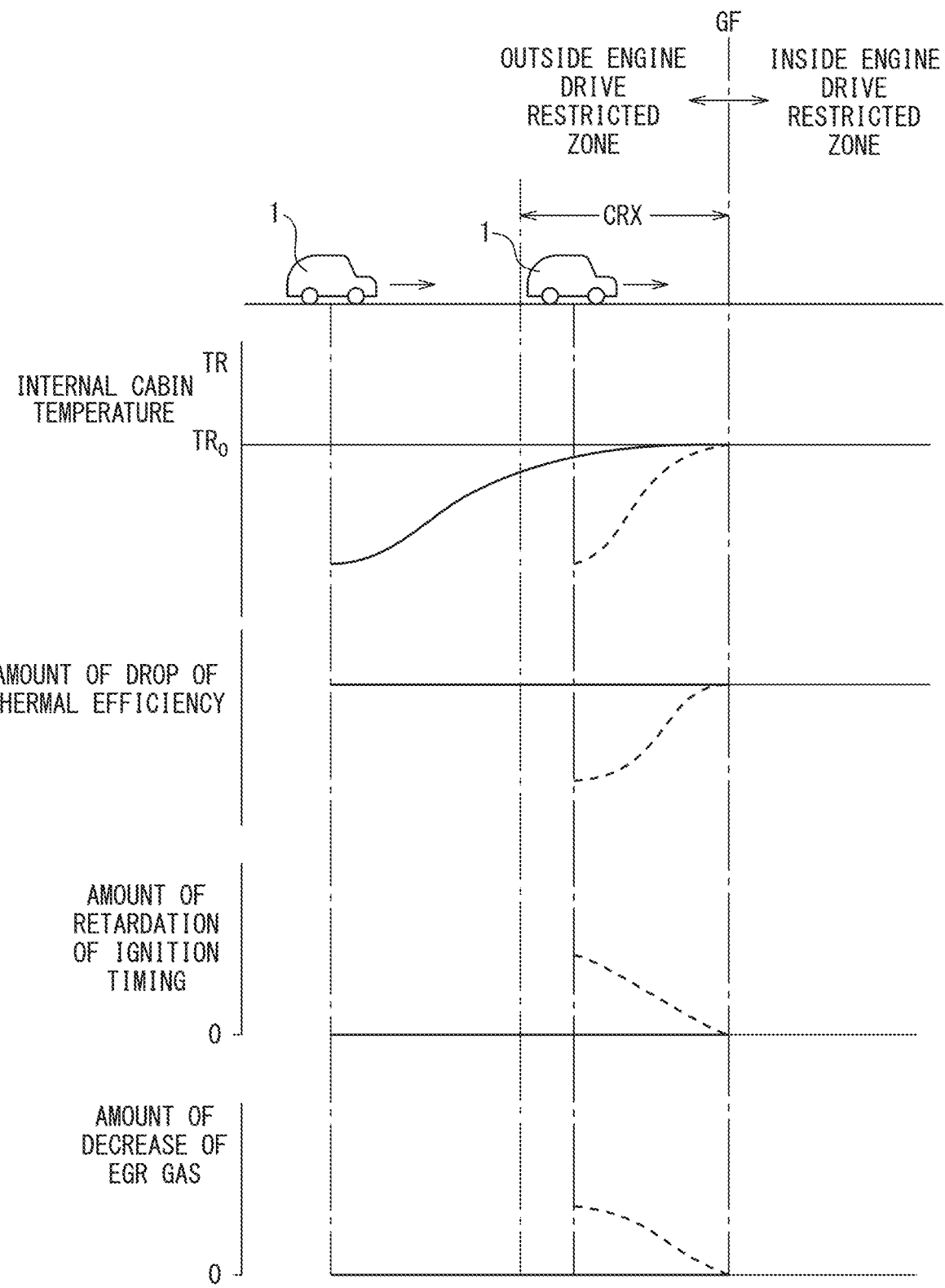
FIG. 16 is a view showing changes along with time of the thermal efficiency, the amount of retardation of the ignition timing, and an amount of decrease of the EGR gas with respect to the amount of EGR gas at the time of normal operation.

FIG. 16 schematically shows the changes along with time of the temperature TR inside the cabin 40, the amount of reduction of the thermal efficiency, the amount of retardation of the ignition timing, and the amount of decrease of the EGR gas with respect to the amount of EGR gas at the time of normal operation in the embodiment according to the present invention in the case where the temperature TR inside the cabin 40 is lower than the set temperature $TR_0$ preset by a rider of the host vehicle 1 and the heating device is used to make the temperature TR inside the cabin 40 rise. In FIG. 16, the solid line shows the changes along with time of the temperature TR inside the cabin 40, the amount of reduction of the thermal efficiency, the amount of retardation of the ignition timing, and the amount of decrease of the EGR gas at the time of normal operation, while the broken line shows the changes along with time of the temperature TR inside the cabin 40, the amount of reduction of the thermal efficiency, the amount of retardation of the ignition timing, and the amount of decrease of the EGR gas when it is predicted that the host vehicle 1 will enter inside of the engine drive restricted zone and, for example, it is judged that the distance CR between the host vehicle 1 and the boundary GF is within the preset distance CRX.

As will be understood from FIG. 16, at the time of normal operation, even if using the heating device to make the temperature TR inside the cabin 40 rise, the amount of reduction of the thermal efficiency, the amount of retardation of the ignition timing, and the amount of decrease of the EGR gas are maintained constant. That is, at the time of normal operation, there is no action performed reducing the thermal efficiency. Therefore, at the time of normal operation, there is no action performed retarding the ignition timing, and the opening degree of the EGR control valve is maintained at the basic EGR control valve opening degree D. As opposed to this, when it is predicted that the host vehicle 1 will enter inside of the engine drive restricted zone and, for example, it is judged that the distance CR between the host vehicle 1 and the boundary GF is within the preset distance CRX, as shown by the broken line, the thermal efficiency is greatly reduced, that is, the ignition timing is retarded, or the amount of decrease of the EGR gas with respect to the amount of EGR gas at the time of normal operation is made larger and accordingly the temperature TR inside the cabin 40 is made to rise to the preset set temperature $TR_0$ before the host vehicle 1 enters the inside of the engine drive restricted zone.

Figure 17:
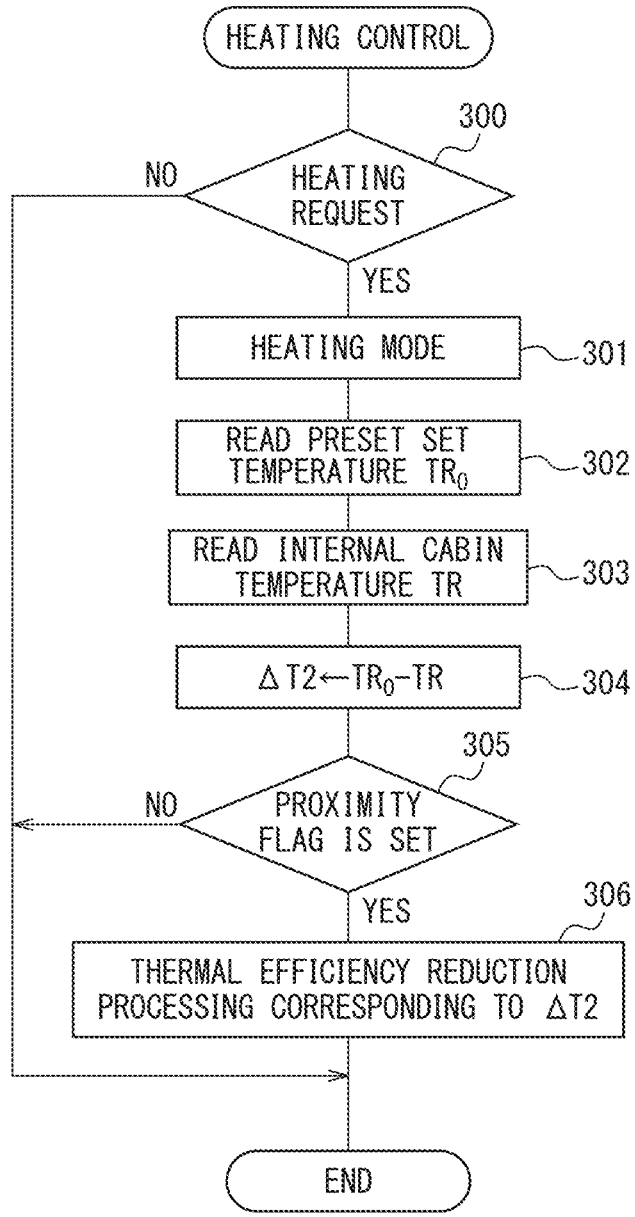
FIG. 17 is a flow chart for performing heating control.

FIG. 17 shows a heating control routine performed at the electronic control unit 5 every fixed time period. Referring to FIG. 17, first, at step 300, it is judged if a heating request is made by a rider of the host vehicle 1. If the heating request is not made, the processing cycle is ended. As opposed to this, if the heating request is made, the routine proceeds to step 301 where the air-conditioning device 3 is made the heating mode for performing the heating action. Next, at step 302, the set temperature $TR_0$ preset by a rider of the host vehicle 1 is read. Next, at step 303, the detected value of the temperature TR inside the cabin 40 is read. Next, at step 304, the temperature difference $\Delta T2$ (=preset set temperature $TR_0$-internal cabin temperature TR) is calculated. Next, at step 305, it is judged if the proximity flag is set. When the proximity flag is not set, the processing cycle is ended. As opposed to this, when the proximity flag is set, the routine proceeds to step 306 where processing for lowering the thermal efficiency as shown in FIG. 12 in accordance with the temperature difference $\Delta T2$, that is, processing for retarding the ignition timing or processing for decreasing the amount of EGR gas compared with the time of normal operation, is performed.

Figure 18:
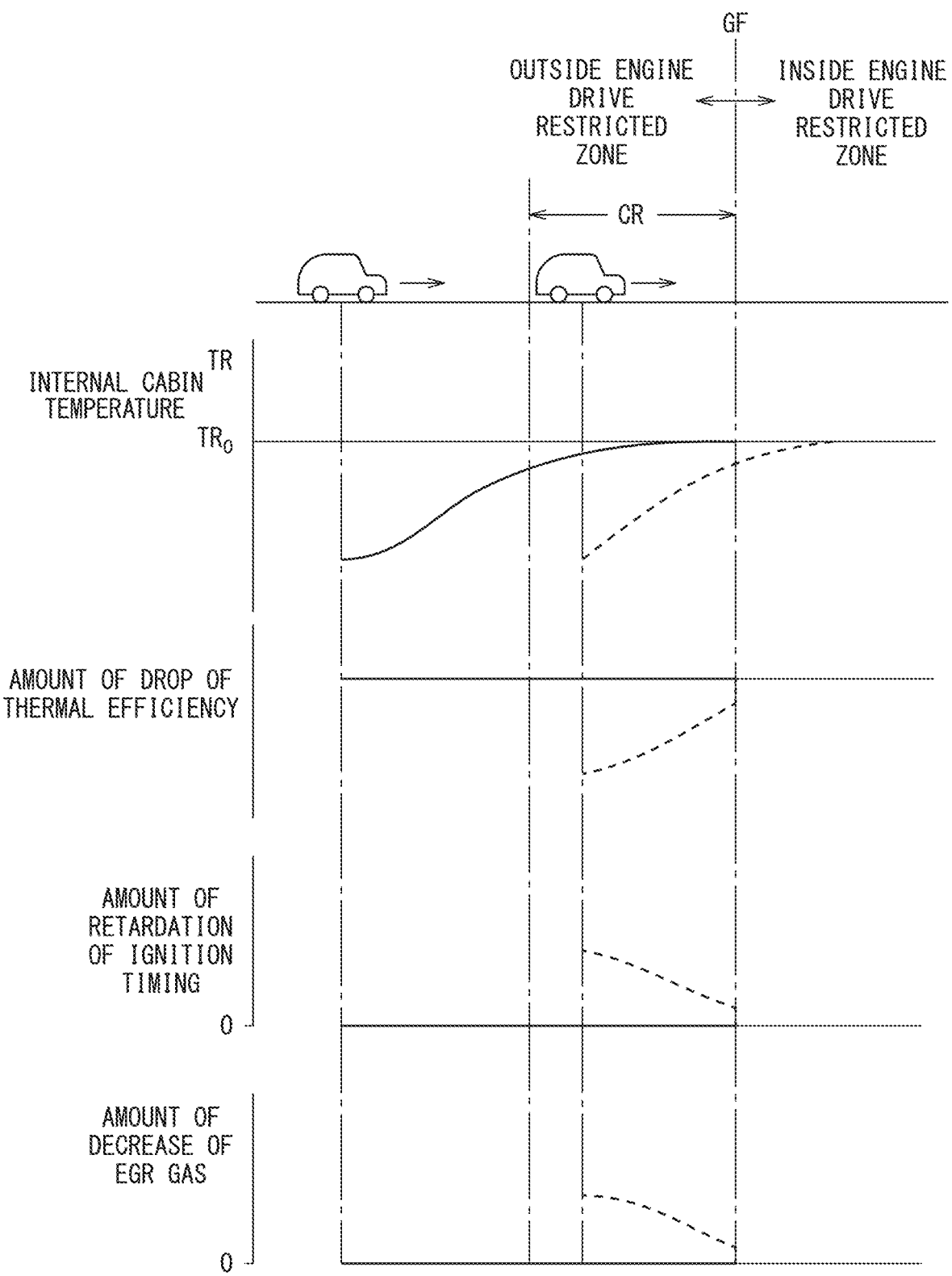
FIG. 18 is a view showing another example of changes along with time of the thermal efficiency, the amount of retardation of the ignition timing, and the amount of decrease of the EGR gas with respect to the amount of EGR gas at the time of normal operation.

FIG. 18 shows another example of the embodiment shown in FIG. 16. In this example as well, the solid line shows the changes along with time of the temperature TR inside the cabin 40, the amount of reduction of the thermal efficiency, the amount of retardation of the ignition timing, and the amount of decrease of the EGR gas at the time of normal operation, while the broken line shows the changes along with time of the temperature TR inside the cabin 40, the amount of reduction of the thermal efficiency, the amount of retardation of the ignition timing, and the amount of decrease of the EGR gas when it is predicted that the host vehicle 1 will enter inside of the engine drive restricted zone and, for example, it is judged that the distance CR between the host vehicle 1 and the boundary GF is within the preset distance CRX. In this example as well, when it is predicted that the host vehicle 1 will enter inside of an engine drive restricted zone and, for example, it is judged that the distance CR between the host vehicle 1 and the boundary GF is within the preset distance CRX, as shown by the broken line, the thermal efficiency is lowered, that is, the ignition timing is greatly retarded, or the amount of decrease of the EGR gas with respect to the amount of EGR gas at the time of normal operation is made greater.

In this case, in this example, before the host vehicle 1 enters the inside of the engine drive restricted zone, the temperature TR inside the cabin 40 is made to rise to the preset set temperature $TR_0$ side from an intermediate value between the current temperature and the preset set temperature $TR_0$. On the other hand, if the host vehicle 1 enters the inside of the engine drive restricted zone, the operation of the internal combustion engine 20 is stopped, and therefore, in this example, after the host vehicle 1 enters the inside of the engine drive restricted zone, the high temperature cooling water remaining inside the water jacket of the internal combustion engine 20 is supplied a little at a time to the heater core 60 by driving the electric powered water pump 61 at a low speed and thereby the temperature TR inside the cabin 40 is made to rise to the preset set temperature $TR_0$.

In this way, in this example, the adjusting device 80 shown in FIG. 5 is comprised of a heating device having the heater core 60 through which cooling water of the internal combustion engine 20 circulates. When it is judged by the judging unit 82 shown in FIG. 5 that the time period TM required for the host vehicle 1 to reach the boundary GF is within the preset TMX or the distance CR between the host vehicle 1 and the boundary GF is within the preset distance CRX, the thermal efficiency of the internal combustion engine 20 is controlled so that the temperature TR inside the cabin 40 changes from the current temperature to the preset set heating temperature $TR_0$ side from an intermediate value of the current temperature and the preset set cooling temperature $TR_0$ before the host vehicle 1 enters the inside of the engine drive restricted zone.

In this case, in this example, if comparing cases where the temperature difference $\Delta T2$ between the current temperature of the cabin 40 and the preset set heating temperature $TR_0$ is the same, when it is judged that the time period TM required for the host vehicle 1 to reach the boundary GF is within the preset TMX or when it is judged that the distance CR between the host vehicle 1 and the boundary GF is within the preset distance CRX, the thermal efficiency of the internal combustion engine 20 is made to fall compared with when it is judged that the time period TM required for the host vehicle 1 to reach the boundary GF is more than the preset time period TMX or the distance CR between the host vehicle 1 and the boundary GF is more than the preset distance CRX.

Figure 19:
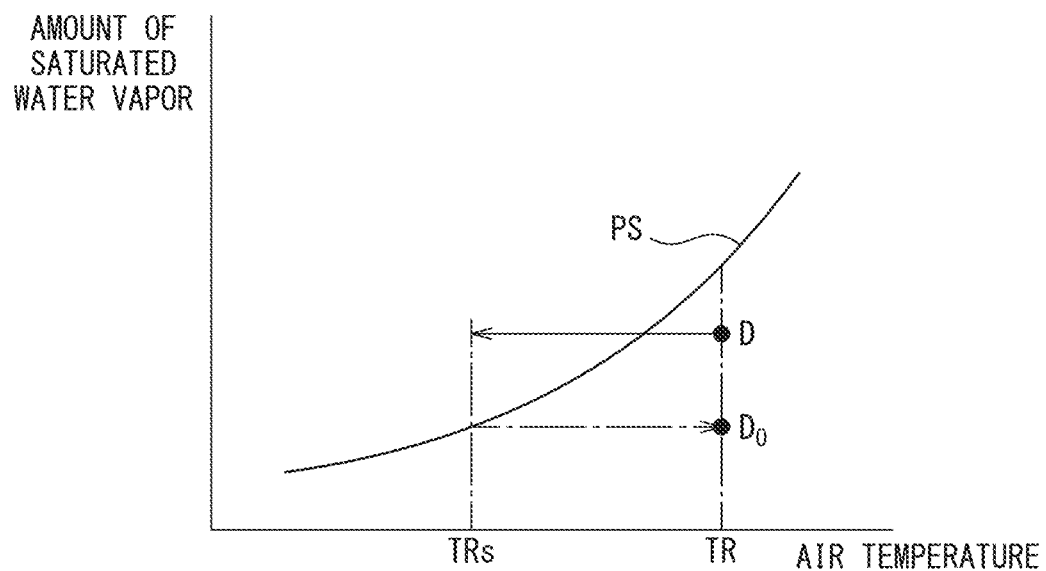
FIG. 19 is a view showing a saturated amount of water vapor.

Next, referring to FIG. 19 to FIG. 23, the case of making the humidity inside the cabin 40 fall when the humidity inside the cabin 40 is higher than the set humidity preset by a rider of the host vehicle 1 will be explained. First, the method of lowering the humidity will be simply explained while referring to FIG. 19. Note that, FIG. 19 shows the relationship between the saturated water vapor curve PS and the air temperature. In FIG. 19, if the current air temperature inside of the cabin 40 is TR, the current humidity inside the cabin 40 is D, and the preset set humidity is $D_0$, if making the air temperature inside of the cabin 40 fall from TR to TRs, part of the water vapor contained in the air will be removed by liquefaction and the amount of water vapor in the air will become the amount of saturated water vapor at the air temperature TRs. After that, if the air temperature inside of the cabin 40 is made to rise to TR, the humidity will become the set humidity $D_0$. In this way, if cooling the air once and then heating the cooled air, the humidity can be lowered.

Figure 20:
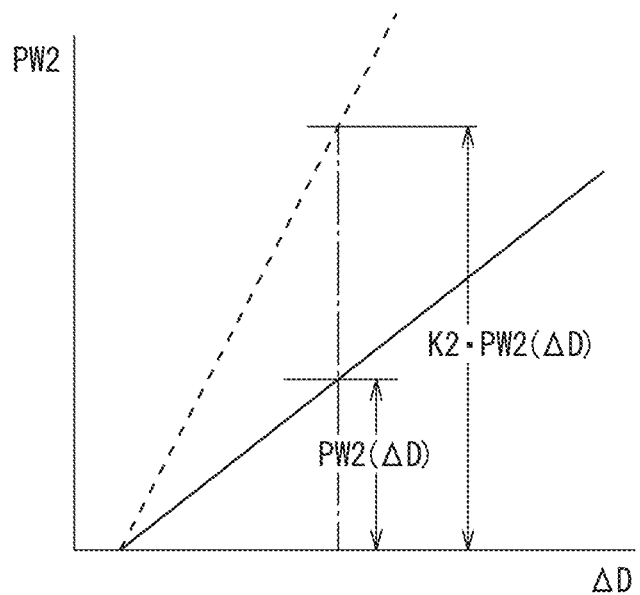
FIG. 20 is a view showing a drive electric power PW2 of the compressor of the cooling device.

In the embodiment according to the present invention, in this way, dehumidification processing for lowering the humidity is performed by the air-conditioning device 3. That is, to lower the humidity, the air-conditioning device 3 is made the dehumidifying mode performing the dehumidifying action. In FIG. 3, the dehumidification processing is performed by cooling the air sent out from the blower 42 by the evaporator 51 and then heating this air by the heater core 60. Therefore, when the dehumidification processing is performed, the position of the door 44 is made a position where the air cooled by the evaporator 51 passes through the heater core 60. In the embodiment according to the present invention, the drive electric power of the refrigerant-use compressor 52 is controlled so that the humidity inside the cabin 40 becomes the preset set humidity Do. In this case, the more the drive electric power of the refrigerant-use compressor 52 is made to increase, the more rapidly the humidity inside the cabin 40 is made to fall. FIG. 20 shows an example of the relationship between the drive electric power PW2 of the refrigerant-use compressor 52 and the humidity difference $\Delta D$ between the humidity D inside the cabin 40 and the preset set humidity Do (=internal cabin humidity D− preset set humidity $D_0$) in the embodiment according to the present invention. Note that, in FIG. 20, the solid line shows the relationship PW2 ($\Delta D$) between the drive electric power PW2 of the refrigerant-use compressor 52 and the humidity difference $\Delta D$ at the time of normal operation. As shown in FIG. 20, in this example, the larger the humidity difference $\Delta D$, the larger the drive electric power PW2 of the refrigerant-use compressor 52 is made.

On the other hand, in FIG. 20, the broken line shows the relationship K2·PW2 ($\Delta D$) between the drive electric power PW2 of the refrigerant-use compressor 52 and the humidity difference $\Delta D$ when it is predicted that the host vehicle 1 will enter inside of the engine drive restricted zone, for example, it is judged that the distance CR between the host vehicle 1 and the boundary GF is within the preset distance CRX. Here, K2 shows a constant. In the example shown in FIG. 20, this constant K2 is larger than 1. Therefore, if comparing cases where the humidity difference $\Delta D$ is the same, it will be understood that if it is predicted that the host vehicle 1 will enter inside of an engine drive restricted zone, the drive electric power PW2 of the refrigerant-use compressor 52 when it is judged that the distance CR between the host vehicle 1 and the boundary GF is within the preset distance CRX is greatly increased compared with the drive electric power PW2 of the refrigerant-use compressor 52 when it is judged that the distance CR between the host vehicle 1 and the boundary GF is more than the preset distance CRX, that is, the drive electric power PW2 of the refrigerant-use compressor 52 at the time of normal operation.

Figure 21:
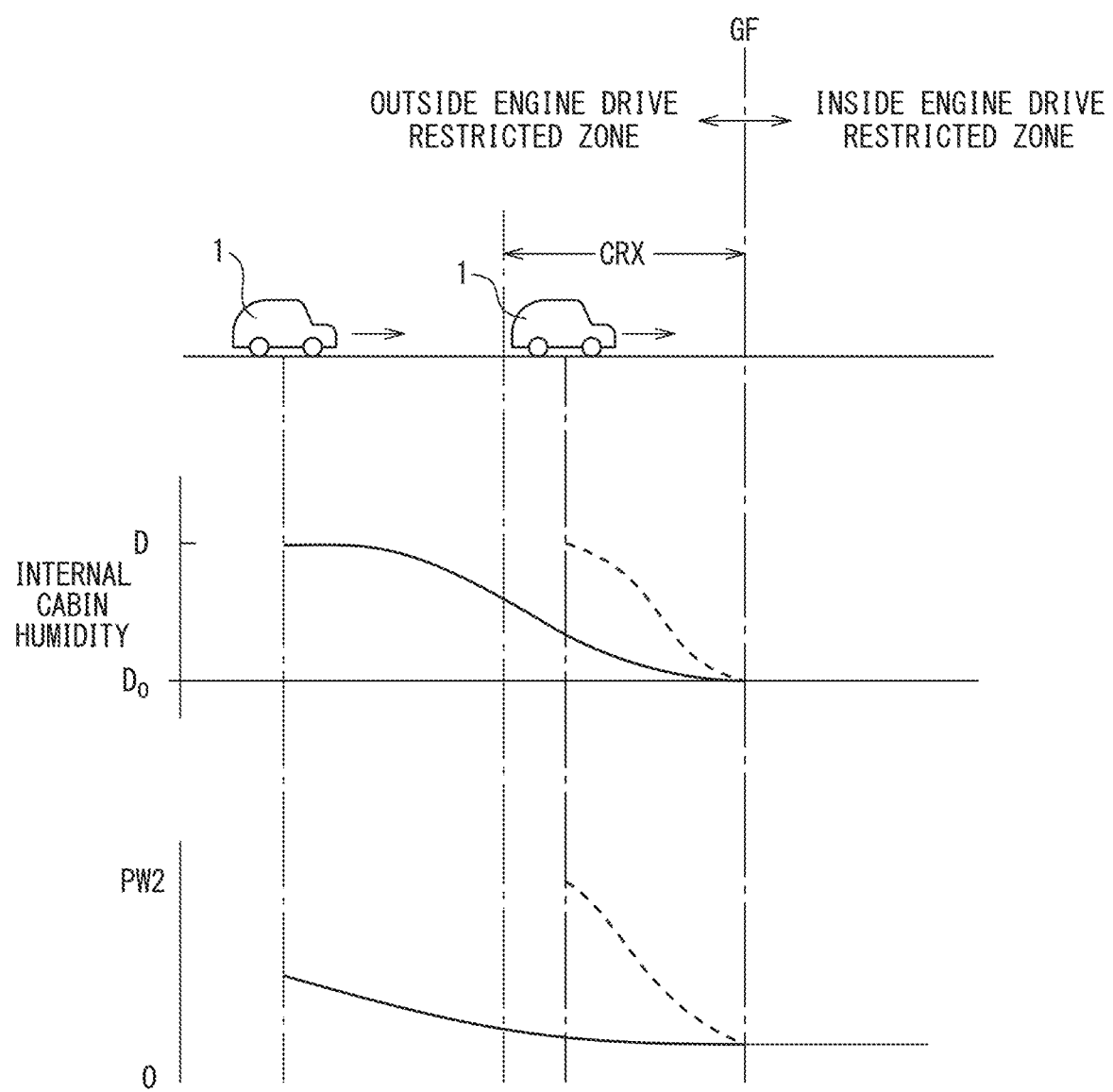
FIG. 21 is a view showing a change along with time of the drive electric power PW2 of the compressor.

FIG. 21 schematically shows the changes along with time of the humidity D inside the cabin 40 and the drive electric power PW2 of the refrigerant-use compressor 52 in the embodiment according to the present invention if lowering the humidity inside the cabin 40 when the humidity inside the cabin 40 is higher than the set humidity preset by a rider of the host vehicle 1. In FIG. 21, the solid line shows the changes along with time of the humidity D inside the cabin 40 at the time of normal operation and the drive electric power PW2 of the refrigerant-use compressor 52, while the broken line shows the changes along with time of the humidity D inside the cabin 40 and the drive electric power PW2 of the refrigerant-use compressor 52 when it is predicted that the host vehicle 1 will enter inside of the engine drive restricted zone and, for example, it is judged that the distance CR between the host vehicle 1 and the boundary GF is within the preset distance CRX. As will be understood from FIG. 21, in this example, when it is predicted that the host vehicle 1 will enter inside of the engine drive restricted zone and, for example, it is judged that the distance CR between the host vehicle 1 and the boundary GF is within the preset distance CRX, as shown by the broken line, the drive electric power PW2 of the refrigerant-use compressor 52 is greatly increased whereby the humidity D inside the cabin 40 is lowered to the preset set humidity $D_0$ before the host vehicle 1 enters the inside of the engine drive restricted zone.

Figure 22:
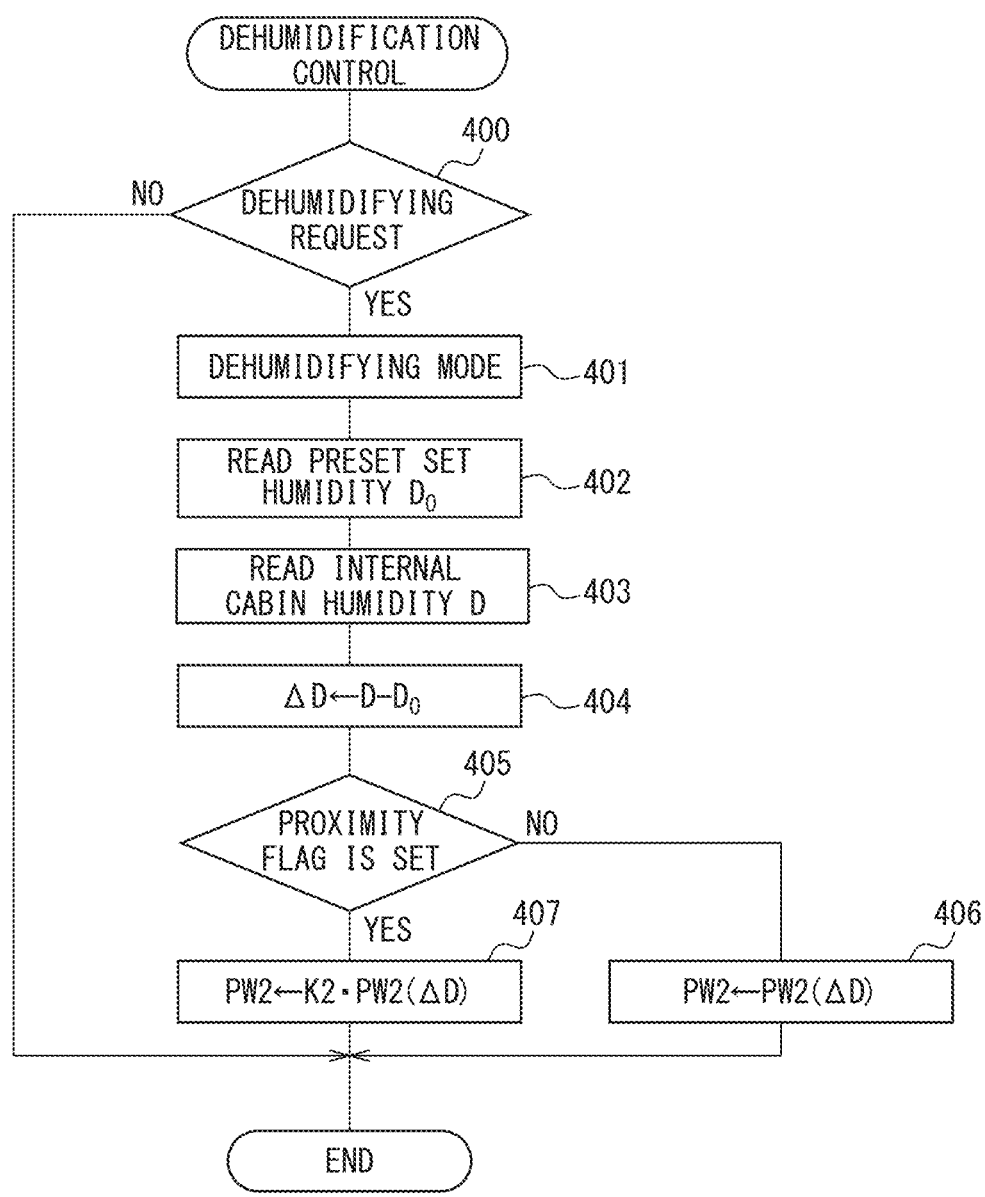
FIG. 22 is a flow chart for performing dehumidification control.

FIG. 22 shows a dehumidification control routine performed at the electronic control unit 5 every fixed time period. Referring to FIG. 22, first, at step 400, it is judged if a dehumidifying request is made by a rider of the host vehicle 1. If the dehumidifying request is not made, the processing cycle is ended. As opposed to this, if the dehumidifying action is made, the routine proceeds to step 401 where the air-conditioning device 3 is made the dehumidifying mode performing a dehumidifying action. Next, at step 402, the set humidity $D_0$ preset by a rider of the host vehicle 1 is read. Next, at step 403, the detected value of the humidity D inside the cabin 40 is read. Next, at step 404, a humidity difference $\Delta D$ (=internal cabin humidity D–preset set humidity Do) is calculated. Next, at step 405, it is judged if the proximity flag is set. If the proximity flag is not set, the routine proceeds to step 406 where the drive electric power PW2 of the refrigerant-use compressor 52 is made the drive electric power PW2 ($\Delta D$) corresponding to the humidity difference $\Delta D$ shown by the solid line in FIG. 20. As opposed to this, when the proximity flag is set, the routine proceeds to step 407 where the drive electric power PW2 of the refrigerant-use compressor 52 is made the drive electric power K2·PW2 ($\Delta D$) corresponding to the humidity difference $\Delta D$ shown by the broken line in FIG. 20.

Figure 23:
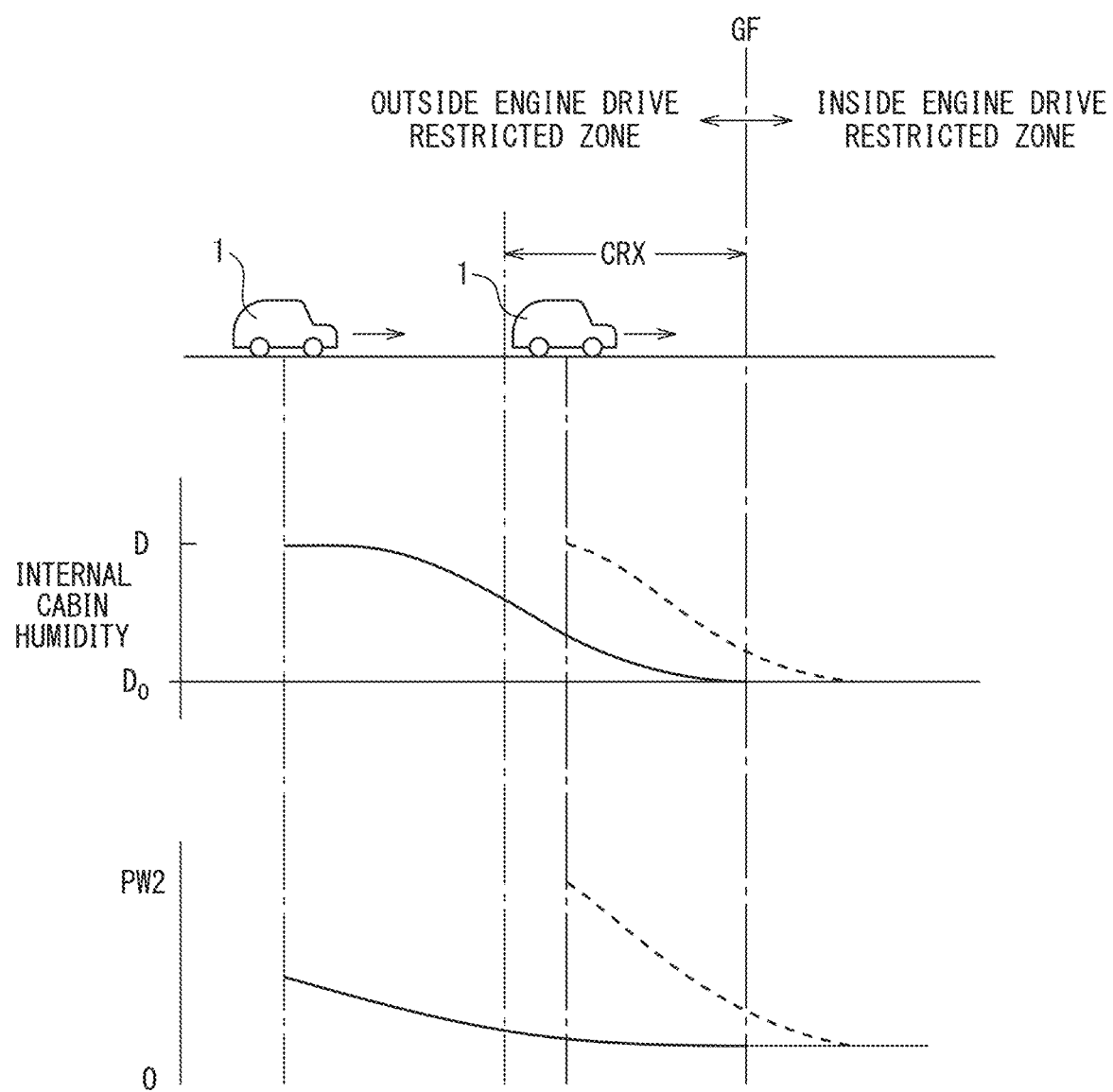
FIG. 23 is a view showing another example of a change along with time of the drive electric power PW2 of the compressor.

FIG. 23 shows another example of the embodiment shown in FIG. 21. In this example as well, the solid line shows the changes along with time of the humidity D inside the cabin 40 at the time of normal operation and the drive electric power PW2 of the refrigerant-use compressor 52. The broken line shows the changes along with time of the humidity D inside the cabin 40 and the drive electric power PW2 of the refrigerant-use compressor 52 when it is predicted that the host vehicle 1 will enter inside of the engine drive restricted zone and, for example, it is judged that the distance CR between the host vehicle 1 and the boundary GF is within the preset distance CRX. In this example as well, when it is predicted that the host vehicle 1 will enter inside of the engine drive restricted zone and, for example, it is judged that the distance CR between the host vehicle 1 and the boundary GF is within the preset distance CRX, as shown by the broken line, the drive electric power PW2 of the refrigerant-use compressor 52 is greatly increased. In this case, in this example, before the host vehicle 1 enters the inside of the engine drive restricted zone, the humidity D inside the cabin 40 is lowered to the preset set humidity $D_0$ side from an intermediate value of the current humidity and the preset set humidity Do.

In this way, in this example, the adjusting device 80 shown in FIG. 5 is comprised of a dehumidifying device having the refrigerant-use compressor 52 and the heater core 60 through which the cooling water of the internal combustion engine 20 circulates. When it is judged by the judging unit 82 shown in FIG. 5 that the time period TM required for the host vehicle 1 to reach the boundary GF is within the preset TMX or it is judged that the distance CR between the host vehicle 1 and the boundary GF is within the preset distance CRX, the refrigerant-use compressor 52 is controlled so that the humidity D inside the cabin 40 changes from the current humidity to the preset set humidity $D_0$ side from an intermediate humidity between the current humidity and the preset set humidity before the host vehicle 1 enters the inside of the engine drive restricted zone.

In this case, in this example, if comparing cases where the humidity difference $\Delta D$ between the current humidity of the cabin 40 and the preset set humidity Do is the same, when it is judged that the time period TM required for the host vehicle 1 to reach the boundary GF is within the preset TMX or when it is judged that the distance CR between the host vehicle 1 and the boundary GF is within the preset distance CRX, the drive electric power PW2 of the refrigerant-use compressor 52 is made to increase compared with when the time period TM required for the host vehicle 1 to reach the boundary GF is more than the preset time period TMX or when the distance CR between the host vehicle 1 and the boundary GF is more than the preset distance CRX.

Figure 24:
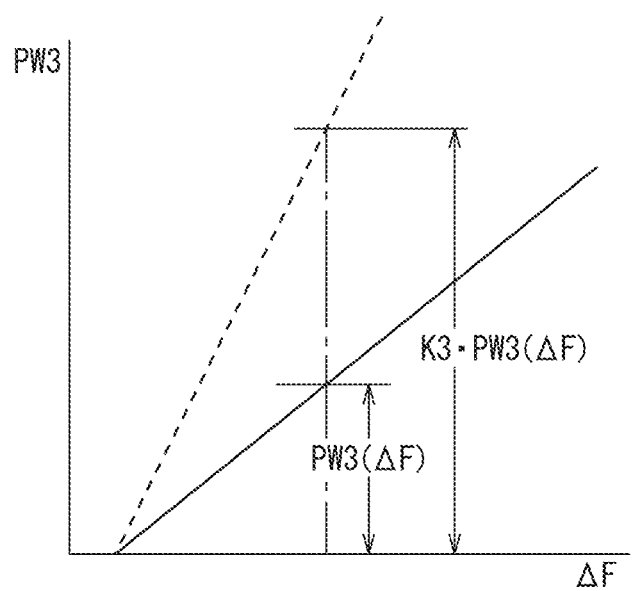
FIG. 24 is a view showing a drive electric power PW3 of an air purifier.

Next, referring to FIG. 24 to FIG. 27, the case where when the air pollution degree inside of the cabin 40 is higher than the set air pollution degree preset by a rider of the host vehicle 1, the air purifier 4 is used to lower the air pollution degree inside of the cabin 40 will be explained. In this case, as already explained while referring to FIG. 3, the more the drive electric power of the air purifier 4 is made to increase, the more rapid the air pollution degree inside of the cabin 40 is made to fall. FIG. 24 shows one example of the relationship between the drive electric power PW3 of the air purifier 4 and the air pollution degree difference $\Delta F$ of the air pollution degree inside of the cabin 40 and the preset set air pollution degree (=air pollution degree inside the cabin–preset set air pollution degree) in the embodiment according to the present invention. Note that, in FIG. 24, the solid line shows the relationship PW3 ($\Delta F$) of the drive electric power PW3 of the air purifier 4 at the time of normal operation and the air pollution degree difference $\Delta F$. As shown in FIG. 24, in this example, the larger the air pollution degree difference $\Delta F$, the larger the drive electric power PW3 of the air purifier 4 is made.

On the other hand, in FIG. 24, the broken line shows the relationship K3·PW3($\Delta F$) between the drive electric power PW3 of the air purifier 4 and the air pollution degree difference $\Delta F$ when it is predicted that the host vehicle 1 will enter inside of the engine drive restricted zone and, for example, it is judged that the distance CR between the host vehicle 1 and the boundary GF is within the preset distance CRX. Here, K3 shows a constant. In the example shown in FIG. 24, this constant K3 is larger than 1. Therefore, if comparing cases where the air pollution degree difference $\Delta F$ is the same, it will be understood that if it is predicted that the host vehicle 1 will enter inside of the engine drive restricted zone, the drive electric power PW3 of the air purifier 4 when it is judged that the distance CR between the host vehicle 1 and the boundary GF is within the preset distance CRX is greatly increased compared to the drive electric power PW3 of the air purifier 4 when it is judged that the distance CR between the host vehicle 1 and the boundary GF is more than the preset distance CRX, that is, the drive electric power PW3 of the air purifier 4 at the time of normal operation.

Figure 25:
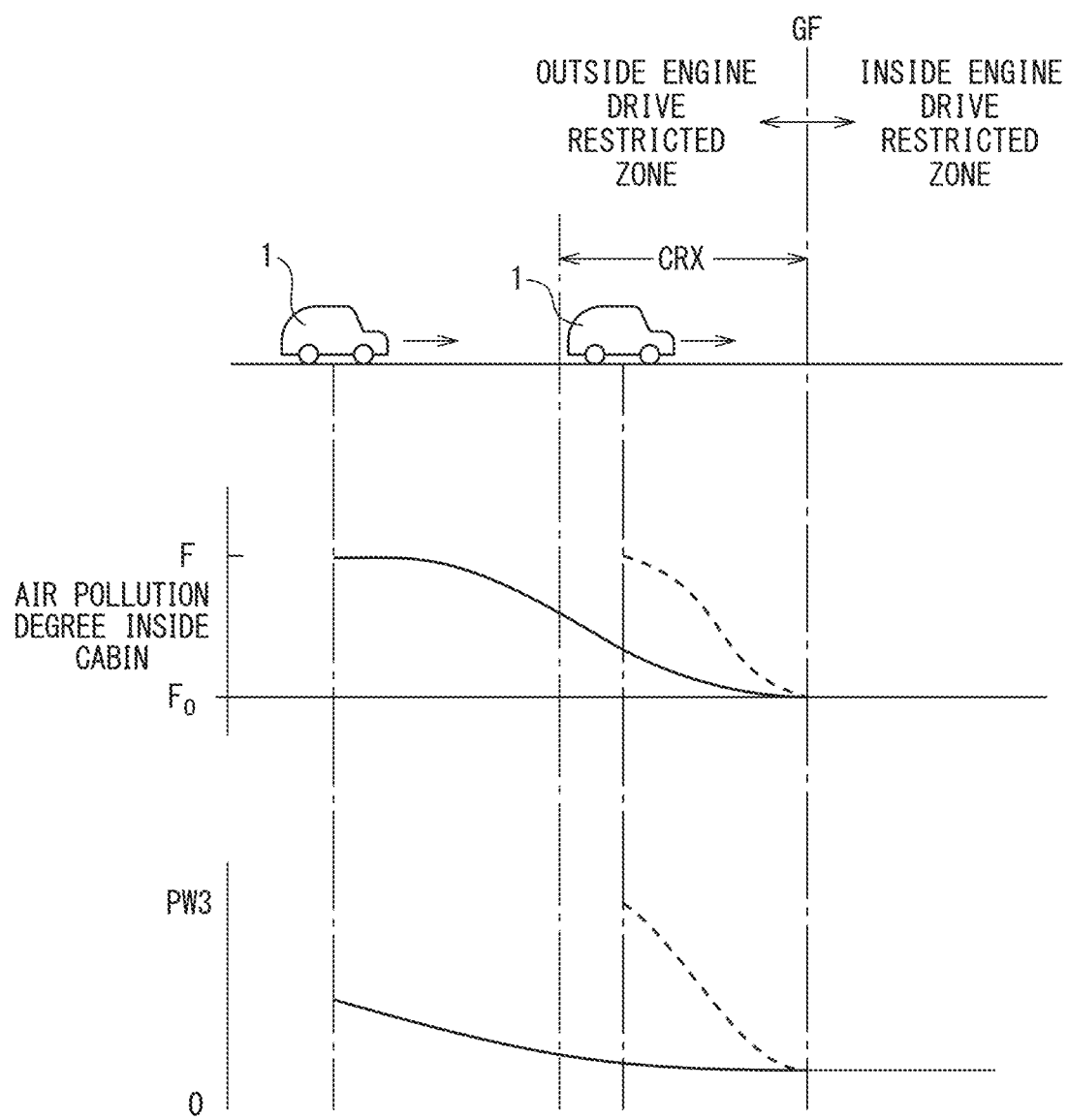
FIG. 25 is a view showing a change along with time of the drive electric power PW3 of the air purifier.

FIG. 25 schematically shows the changes along with time of the air pollution degree F. inside of the cabin 40 and the drive electric power PW3 of the air purifier 4 in the embodiment according to the present invention in the case of using the air purifier 4 to lower the air pollution degree inside the cabin 40 when the air pollution degree inside of the cabin 40 is higher than the set air pollution degree preset by a rider of the host vehicle 1. In FIG. 25, the solid line shows the changes along with time of the air pollution degree F. inside of the cabin 40 and the drive electric power PW3 of the air purifier 4 at the time of normal operation, while the broken line shows the changes along with time of the air pollution degree F. inside of the cabin 40 and the drive electric power PW3 of the air purifier 4 when it is predicted that the host vehicle 1 will enter inside of the engine drive restricted zone and, for example, it is judged that the distance CR between the host vehicle 1 and the boundary GF is within the preset distance CRX. As will be understood from FIG. 25, in this example, when it is predicted that the host vehicle 1 will enter inside of the engine drive restricted zone and, for example, it is judged that the distance CR between the host vehicle 1 and the boundary GF is within the preset distance CRX, as shown by the broken line, the drive electric power PW3 of the air purifier 4 is greatly increased whereby the air pollution degree F. inside of the cabin 40 is made to fall to the preset set air pollution degree $F_{\cdot 0}$ before the host vehicle 1 enters the inside of the engine drive restricted zone.

Figure 26:
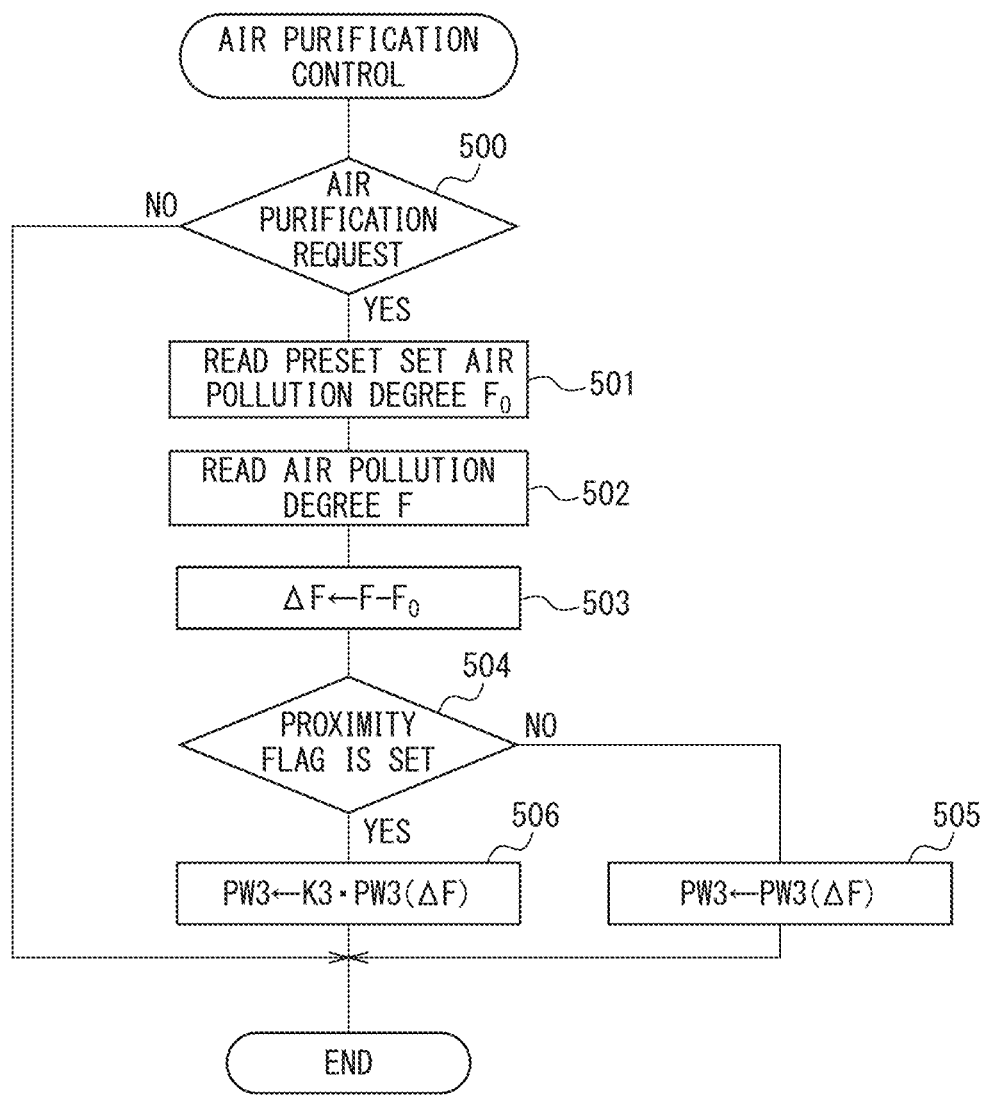
FIG. 26 is a flow chart for performing air purification control.

FIG. 26 shows the air purification control routine performed every fixed time period in the electronic control unit 5. Referring to FIG. 26, first, at step 500, it is judged if a request for air purification is made by a rider of the host vehicle 1. If the request for air purification is not made, the processing cycle is ended. As opposed to this, if the request for air purification is made, at step 501 the set air pollution degree $F_{\cdot 0}$ preset by a rider of the host vehicle 1 is read. Next, at step 502, the detected value of the air pollution degree F. inside of the cabin 40 is read. Next, at step 503, the air pollution degree difference ΔF (=interior cabin air pollution degree F.-preset set air pollution degree $F_{\cdot 0}$) is calculated. Next, at step 504, it is judged if the proximity flag is set. When the proximity flag is not set, the routine proceeds to step 505 where the drive electric power PW3 of the air purifier 4 is made the drive electric power PW3 (ΔF) corresponding to the air pollution degree difference ΔF shown by the solid line in FIG. 24. As opposed to this, when the proximity flag is set, the routine proceeds to step 506 where the drive electric power PW3 of the air purifier 4 is made the drive electric power K3·PW3 (ΔF) corresponding to the air pollution degree difference ΔF shown by the broken line in FIG. 24.

Figure 27:
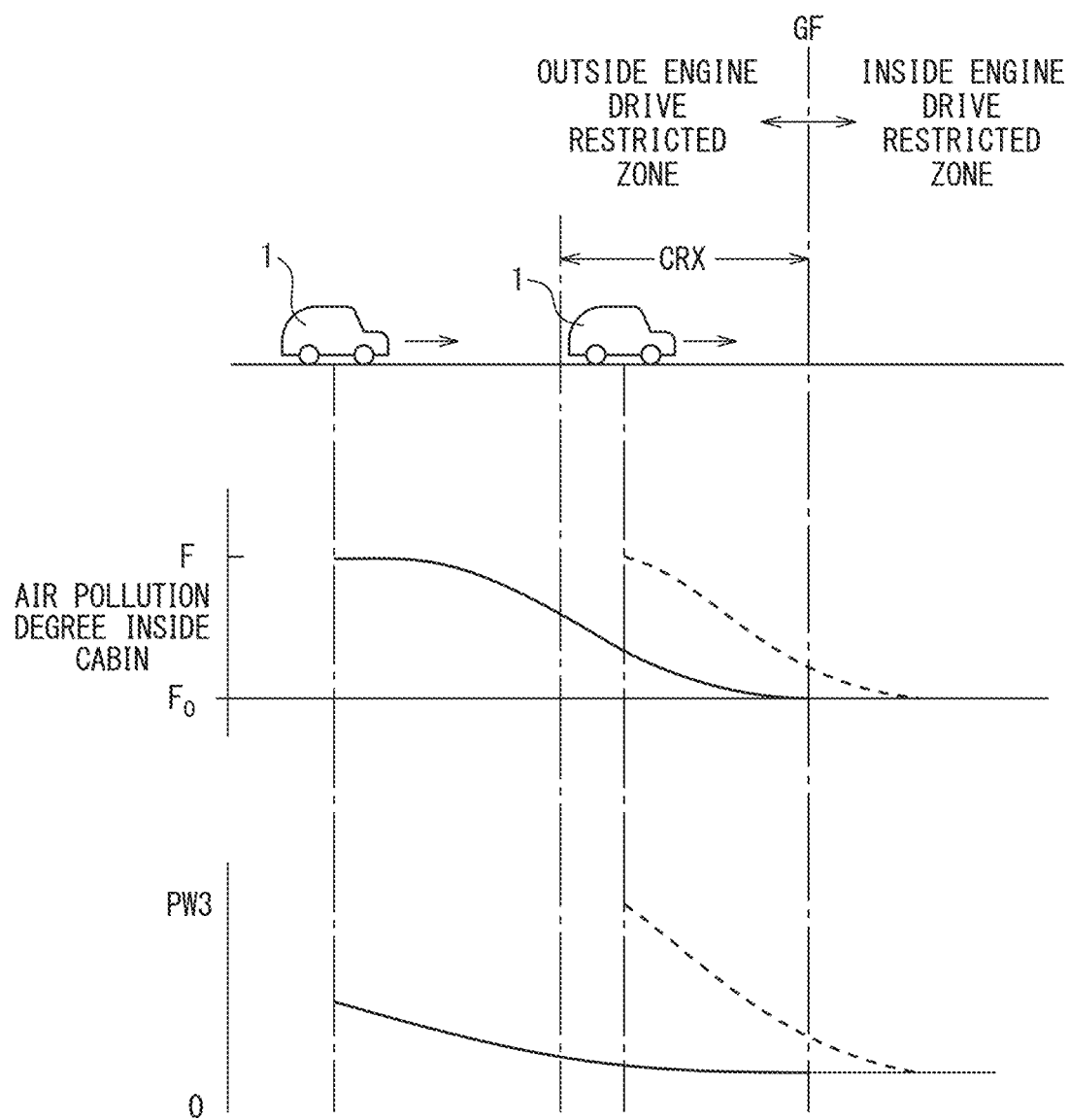
FIG. 27 is a view showing another example of a change along with time of the drive electric power PW3 of the air purifier.

FIG. 27 shows another example of the embodiment shown in FIG. 23. In this example as well, the solid line shows the changes along with time of the air pollution degree F. inside of the cabin 40 and the drive electric power PW3 of the air purifier 4 at the time of normal operation, while the broken line shows the changes along with time of the air pollution degree F. inside of the cabin 40 and the drive electric power PW3 of the air purifier 4 when it is predicted that the host vehicle 1 will enter inside of the engine drive restricted zone and, for example, it is judged that the distance CR between the host vehicle 1 and the boundary GF is within the preset distance CRX. In this example as well, when it is predicted that the host vehicle 1 will enter inside of the engine drive restricted zone and, for example, it is judged that the distance CR between the host vehicle 1 and the boundary GF is within the preset distance CRX, as shown by the broken line, the drive electric power PW3 of the air purifier 4 is greatly increased. In this case, in this example, the air pollution degree F. inside of the cabin 40 is made to fall to the preset set air pollution degree $F_{\cdot 0}$ side from an intermediate air pollution degree between the current air pollution degree and a preset air pollution degree $F_{\cdot 0}$ before the host vehicle 1 enters the inside of the engine drive restricted zone.

In this way, in this example, the adjusting device 80 shown in FIG. 5 is comprised of the air purifier 4 purifying the air inside of the cabin 40. When it is judged by the judging part 82 shown in FIG. 5 that the time period TM required for the host vehicle 1 to reach the boundary GF is within a preset TMX or it is judged that the distance CR between the host vehicle 1 and the boundary GF is within a preset distance CRX, the air purifier 4 is controlled so that the air pollution degree F. inside of the cabin 40 changes from the current air pollution degree to the set air pollution degree $F_{\cdot 0}$ side from an intermediate air pollution degree between the current air pollution degree and the preset air pollution degree $F_{\cdot 0}$ before the host vehicle 1 enters the inside of the engine drive restricted zone.

In this case, in this example, if comparing cases where the air pollution degree difference ΔF between the current air pollution degree F. in the cabin 40 and the preset set air pollution degree $F_{\cdot 0}$ is the same, when it is judged that the time period TM required for the host vehicle 1 to reach the boundary GF is within the preset TMX or it is judged that the distance CR between the host vehicle 1 and the boundary GF is within the preset distance CRX, the drive electric power PW3 of the air purifier 4 is made to increase compared to when it is judged that the time period TM required for the host vehicle 1 to reach the boundary GF is more than the preset time period TMX or when it is judged that the distance CR between the host vehicle 1 and the boundary GF is more than the preset distance CRX.

The invention claimed is:

1. A vehicle control device of a hybrid vehicle driven by only an electric motor or by both of the electric motor and an internal combustion engine, wherein a boundary is set between an inside of an engine drive restricted zone where operation of the internal combustion engine is restricted and an outside of the engine drive restricted zone, said vehicle control device comprising:
   an adjusting device configured to perform at least one adjustment among adjustment of a temperature inside a cabin performed using electric power, adjustment of a humidity inside the cabin performed using electric power, and adjustment of an air pollution degree inside the cabin performed using electric power;
   a navigation device configured to search for a running route up to a destination upon input of the destination;
   an information acquiring unit configured to acquire position information of the hybrid vehicle and information relating to said boundary;
   a judging unit configured to judge whether a time period required for the hybrid vehicle to reach said boundary is within a preset time period or whether a distance between the hybrid vehicle and said boundary is within a preset distance in response to (i) judging, based on the information acquired by the information acquiring unit that the hybrid vehicle is positioned at the outside of the engine drive restricted zone and (ii) predicting, based on search results by the navigation device that the hybrid vehicle will enter the inside of the engine drive restricted zone; and
   an internal cabin environment control unit configured to change, in response to judging by said judging unit (a) that the time period required for the hybrid vehicle to reach said boundary is within the preset time period or (b) that the distance between the hybrid vehicle and said boundary is within the preset distance, a value of at least one of a temperature inside the cabin, a humidity inside the cabin, or an air pollution degree inside the cabin from a current value to a value closer to a preset set value than an intermediate value of the current value and the preset set value before the hybrid vehicle enters the engine drive restricted zone, wherein said adjusting device includes a cooling device having a refrigerant-use compressor, and the internal cabin environment control unit is configured to control the refrigerant-use compressor to cause, in response to judging by said judging unit that (a) the time period required for the hybrid vehicle to reach said boundary is within the preset time period or (b) that the distance between the hybrid vehicle and said boundary is within the preset distance, the temperature inside the cabin to change from a current temperature to a cooling temperature closer to a preset set cooling temperature than an intermediate value of the current temperature and the preset set cooling temperature before the hybrid vehicle enters the inside of the engine drive restricted zone.

2. The vehicle control device according to claim 1, wherein the internal cabin environment control unit is configured to change, in response to judging by said judging unit that (a) the time period required for the hybrid vehicle to reach said boundary is within the preset time period or (b) that the distance between the hybrid vehicle and said boundary is within the preset distance, the value of at least one of the temperature inside the cabin, the humidity inside the cabin, or the air pollution degree inside the cabin from the current value to the preset set value before the hybrid vehicle enters the inside of the engine drive restricted zone.

3. The vehicle control device according to claim 1, wherein in a first case, the time period required for the hybrid vehicle to reach said boundary is within the preset time period or the distance between the hybrid vehicle and said boundary is within the preset distance, in a second case, the time period required for the hybrid vehicle to reach said boundary is more than the preset time period or the distance between the hybrid vehicle and said boundary is more than the preset distance, a temperature difference between the current temperature inside the cabin and the preset set cooling temperature in the first case is the same as a temperature difference between the current temperature inside the cabin and the preset set cooling temperature in the second case, and the internal cabin environment control unit is configured to cause a drive electric power of the refrigerant-use compressor to increase in the first case compared with the second case.

4. The vehicle control device according to claim 1, wherein said adjusting device further includes a heating device having a heater core through which cooling water of the internal combustion engine circulates, and the internal cabin environment control unit is configured to control a thermal efficiency of the internal combustion engine so that in response to judging by said judging unit that (a) the time period required for the hybrid vehicle to reach said boundary is within the preset time period or (b) that the distance between the hybrid vehicle and said boundary is within the preset distance, the temperature inside the cabin is made to change from a current temperature to a heating temperature closer to a preset set heating temperature than an intermediate value of the current temperature and the preset set heating temperature before the hybrid vehicle enters the inside of the engine drive restricted zone.

5. The vehicle control device according to claim 4, wherein in a first case, the time period required for the hybrid vehicle to reach said boundary is within the preset time period or the distance between the hybrid vehicle and said boundary is within the preset distance, in a second case, the time period required for the hybrid vehicle to reach said boundary is more than the preset time period or the distance between the hybrid vehicle and said boundary is more than the preset distance, a temperature difference between the current temperature inside the cabin and the preset set heating temperature in the first case is the same as a temperature difference between the current temperature inside the cabin and the preset set heating temperature in the second case, and the internal cabin environment control unit is configured to cause the thermal efficiency of the internal combustion engine to be lowered in the first case compared with the second case.

6. The vehicle control device according to claim 5, wherein the thermal efficiency of the internal combustion engine is lowered by retarding an ignition timing of the internal combustion engine.

7. The vehicle control device according to claim 5, wherein the thermal efficiency of the internal combustion engine is lowered by decreasing an amount of recirculated exhaust gas recirculated to an intake passage of the internal combustion engine.

8. The vehicle control device according to claim 1, wherein said adjusting device further includes a dehumidifying device having a refrigerant-use compressor and a heater core through which cooling water of the internal combustion engine circulates, and the internal cabin environment control unit is configured to control the refrigerant-use compressor so that in response to judging by said judging unit that (a) the time period required for the hybrid vehicle to reach said boundary is within the preset time period or (b) that the distance between the hybrid vehicle and said boundary is within the preset distance, the humidity inside the cabin is made to change from a current humidity to a humidity closer to a preset set humidity than an intermediate value of the current humidity and the preset set humidity before the hybrid vehicle enters the inside of the engine drive restricted zone.

9. The vehicle control device according to claim 8, wherein in a first case, the time period required for the hybrid vehicle to reach said boundary is within the preset time period or the distance between the hybrid vehicle and said boundary is within the preset distance, in a second case, the time period required for the hybrid vehicle to reach said boundary is more than the preset time period or the distance between the hybrid vehicle and said boundary is more than the preset distance, a humidity difference between the current humidity inside the cabin and the preset set humidity in the first case is the same as a humidity difference between the current humidity inside the cabin and the preset set humidity in the second case, and the drive electric power of the refrigerant-use compressor is made to increase in the first case compared with the second case.

10. The vehicle control device according to claim 1, wherein said adjusting device further includes an air purifier configured to purify air inside of the cabin, and the internal cabin environment control unit is configured to control the air purifier so that in response to judging by said judging unit that (a) the time period required for the hybrid vehicle to reach said boundary is within the preset time period or (b) that the distance between the hybrid vehicle and said boundary is within the preset distance, the air pollution degree inside the cabin is made to change from a current air pollution degree to an air pollution degree closer to a preset set air pollution degree than an intermediate value of the current air pollution degree and the preset set air pollution degree before the hybrid vehicle enters the inside of the engine drive restricted zone.

11. The vehicle control device according to claim 10, wherein in a first case, the time period required for the hybrid vehicle to reach said boundary is within the preset time period or the distance between the hybrid vehicle and said boundary is within the preset distance, in a second case, the time period required for the hybrid vehicle to reach said boundary is more than the preset time period or the distance between the hybrid vehicle and said boundary is more than the preset distance, an air pollution degree difference between the current air pollution degree inside the cabin and the preset set air pollution degree in the first case is the same as an air pollution degree difference between the current air pollution degree inside the cabin and the preset set air pollution degree in the second case, and the internal cabin environment control unit is configured to cause a drive electric power of the air purifier to increase in the first case compared with the second case.

\* \* \* \* \*